US012701431B2

(12) United States Patent
Matsumura et al.

(10) Patent No.: US 12,701,431 B2
(45) Date of Patent: Aug. 4, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 320 days.

(21) Appl. No.: 18/260,130

(22) PCT Filed: Jan. 8, 2021

(86) PCT No.: PCT/JP2021/000547
§ 371 (c)(1),
(2) Date: Jun. 30, 2023

(87) PCT Pub. No.: WO2022/149274
PCT Pub. Date: Jul. 14, 2022

(65) Prior Publication Data
US 2024/0064527 A1 Feb. 22, 2024

(51) Int. Cl.
*H04W 72/21* (2023.01)
*H04W 16/28* (2009.01)
*H04W 76/20* (2018.01)

(52) U.S. Cl.
CPC ........... *H04W 16/28* (2013.01); *H04W 72/21* (2023.01); *H04W 76/20* (2018.02)

(58) Field of Classification Search
CPC . H04W 72/02; H04W 72/04; H04W 72/0446; H04W 72/121; H04W 72/23; H04W 72/50; H04W 72/51; H04W 72/52; H04W 72/54; H04W 72/541; H04W 72/542; H04W 72/543; H04W 72/56
See application file for complete search history.

(56) References Cited

U.S. PATENT DOCUMENTS

2022/0109541 A1* 4/2022 Cirik ..................... H04L 5/0023
2023/0421233 A1* 12/2023 Li .......................... H04L 5/0094

FOREIGN PATENT DOCUMENTS

CN        111294177 A        6/2020

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
(Continued)

*Primary Examiner* — Bo Hui A Zhu
(74) *Attorney, Agent, or Firm* — Osha Bergman Watanabe & Burton LLP

(57) ABSTRACT

A terminal according to one aspect of the present disclosure includes a control section that determines a spatial relation for a physical uplink control channel on the basis of a control resource set having a lowest identifier, and a transmitting section that simultaneously transmits the physical uplink control channel on the basis of the spatial relation by using a plurality of coherent panels. According to one aspect of the present disclosure, it is possible to appropriately perform simultaneous UL transmission using multiple panels.

5 Claims, 14 Drawing Sheets

(56)         References Cited

OTHER PUBLICATIONS

Catt; "Discussion on enhancements on multi-TRP/panel for PDCCH, PUCCH and PUSCH"; 3GPP TSG RAN WG1 Meeting #102e, R1-2005684; e-Meeting, Aug. 17-28, 2020 (9 pages).

Apple Inc.; "Remaining Issues on Multi-beam operation"; 3GPP TSG-RAN WG1 Meeting #103-e, R1-2008437; e-Meeting, Oct. 26-Nov. 13, 2020 (9 pages).

Apple; "Considerations on multi-panel and MPE in FR2"; 3GPP TSG RAN WG1 #96bis, R1-1904983; Xi'an, China; Apr. 8-12, 2019 (8 pages).

International Search Report issued in PCT/JP2021/000547 on Aug. 24, 2021 (5 pages).

Written Opinion of the International Searching Authority issued in PCT/JP2021/000547 on Aug. 24, 2021 (4 pages).

Office Action issued in Japanese Application No. 2022-573888, mailed Feb. 18, 2025 (6 pages).

Decision of Refusal issued in Japanese Patent Application No. 2022-573888, mailed Jul. 22, 2025 (4 pages).

\* cited by examiner

PRECODING MATRIXES W (ORDERED IN ASCENDING ORDER OF TPMI INDICES, FROM LEFT TO RIGHT)

| TPMI INDICES | | | | | | | | |
|---|---|---|---|---|---|---|---|---|
| 0 – 7 | | | | | | | | |
| 8 – 15 | | | | | | | | |
| 16 – 23 | | | | | | | | |
| 24 – 27 | | | | | | | | |

NON-COHERENT CODEBOOK

PARTIALLY COHERENT CODEBOOK

FULLY COHERENT CODEBOOK

FIG. 1

| Bit field mapped to index | codebookSubset = partialAndNonCoherent |
|---|---|
| 0 | 1 layer: TPMI=0 |
| 1 | 1 layer: TPMI=1 |
| ... | ... |
| 3 | 1 layer: TPMI=3 |
| 4 | 2 layers (1+1 layers): TPMI=0 |
| ... | ... |
| 9 | 2 layers: TPMI=5 |
| 10 | 1+2 layers: TPMI=0 |
| 11 | 1+3 layers: TPMI=0 |
| 12 | 1 layer: TPMI=4 |
| ... | ... |
| 19 | 1 layer: TPMI=11 |
| 20 | 2 layers: TPMI=6 |
| ... | ... |
| 27 | 2 layers: TPMI=13 |
| 28 | 1+2 layers: TPMI=1 |
| 29 | 1+2 layers: TPMI=2 |
| 30 | 1+3 layers: TPMI=1 |
| 31 | 1+3 layers: TPMI=2 |
| 32 | 2+1 layers: TPMI=0 |
| 33 | 2+1 layers: TPMI=1 |
| 34 | 2+1 layers: TPMI=2 |
| 35 | 2+2 layers: TPMI=0 |
| 36 | 3+1 layers: TPMI=0 |
| 37 | 2+2 layers: TPMI=1 |
| 38 | 3+1 layers: TPMI=1 |
| 39 | 2+2 layers: TPMI=2 |
| 40 | 3+1 layers: TPMI=2 |

FIG. 6

Table 7.3.1.1.2-10

| Value | Number of DMRS CDM group(s) without data | DMRS port(s) |
|---|---|---|
| 0 | 2 | 0-2 |
| 2-7 | Reserved | Reserved |

Table 7.3.1.1.2-10A

| Value | Number of DMRS CDM group(s) without data | DMRS port(s) |
|---|---|---|
| 0 | 2 | 0-2 |
| 2 (or 1) | 2 | 0,2,3 |
| 3-7 (or 2-7) | Reserved | Reserved |

Table 7.3.1.1.2-14

| Value | Number of DMRS CDM group(s) without data | DMRS port(s) | Number of front-load symbols |
|-------|------------------------------------------|--------------|------------------------------|
| 0 | 2 | 0-2 | 1 |
| 1 | 2 | 0,1,4 | 2 |
| 2 | 2 | 2,3,6 | 2 |
| 3-15 | Reserved | Reserved | Reserved |

Table 7.3.1.1.2-14A

| Value | Number of DMRS CDM group(s) without data | DMRS port(s) | Number of front-load symbols |
|-------|------------------------------------------|--------------|------------------------------|
| 0 | 2 | 0-2 | 1 |
| 1 | 2 | 0,1,4 | 2 |
| 2 | 2 | 2,3,6 | 2 |
| 3 | 2 | 0,2,3 | 1 |
| 4-15 | Reserved | Reserved | Reserved |

Table 7.3.1.1.2-18

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3-15 | Reserved | Reserved |

Table 7.3.1.1.2-18A

| Value | Number of DMRS CDM group(s) without data | DMRS port(s) |
|---|---|---|
| 0 | 2 | 0-2 |
| 1 | 3 | 0-2 |
| 2 | 3 | 3-5 |
| 3 | 2 | 0,2,3 |
| 4-15 | Reserved | Reserved |

Table 7.3.1.1.2-22

| Value | Number of DMRS CDM group(s) without data | DMRS port(s) | Number of front-load symbols |
|---|---|---|---|
| 0 | 2 | 0-2 | 1 |
| 1 | 3 | 0-2 | 1 |
| 2 | 3 | 3-5 | 1 |
| 3 | 3 | 0,1,6 | 2 |
| 4 | 3 | 2,3,8 | 2 |
| 5 | 3 | 4,5,10 | 2 |
| 6-31 | Reserved | Reserved | Reserved |

Table 7.3.1.1.2-22A

| Value | Number of DMRS CDM group(s) without data | DMRS port(s) | Number of front-load symbols |
|---|---|---|---|
| 0 | 2 | 0-2 | 1 |
| 1 | 3 | 0-2 | 1 |
| 2 | 3 | 3-5 | 1 |
| 3 | 3 | 0,1,6 | 2 |
| 4 | 3 | 2,3,8 | 2 |
| 5 | 3 | 4,5,10 | 2 |
| 6 | 2 | 0,2,3 | 1 |
| 7-31 | Reserved | Reserved | Reserved |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (also referred to as, for example, "5th generation mobile communication system (5G)," "5G+(plus)," "6th generation mobile communication system (6G)," "New Radio (NR)," "3GPP Rel. 15 (or later versions)," and so on) are also under study.

In existing LTE systems (e.g., 3GPP Rel. 8 to Rel. 14), a user terminal (User Equipment (UE)) transmits uplink control information (UCI) by using at least one of a UL data channel (e.g., a Physical Uplink Shared Channel (PUSCH)) and a UL control channel (e.g., a Physical Uplink Control Channel (PUSCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In NR, a UE can use one of multiple panels (multiple beams) for uplink (UL) transmission. However, simultaneous UL transmission using the multiple panels has not been fully studied. Unless the simultaneous UL transmission using the multiple panels is appropriately performed, system performance degradation, such as throughput reduction, may occur.

Thus, an object of the present disclosure is to provide a terminal, a radio communication method, and a base station that appropriately perform simultaneous UL transmission using multiple panels.

Solution to Problem

A terminal according to one aspect of the present disclosure includes a control section that determines a spatial relation for a physical uplink control channel on the basis of a control resource set having a lowest identifier, and a transmitting section that simultaneously transmits the physical uplink control channel on the basis of the spatial relation by using a plurality of coherent panels.

Advantageous Effects of Invention

According to one aspect of the present disclosure, it is possible to appropriately perform simultaneous UL transmission using multiple panels.

BRIEF DESCRIPTION OF DRAWINGS

FIG. 1 is a diagram to show an example of an association between a precoder type and a TPMI index.

FIG. 6 shows an example of an association (table) between a field value of precoding information and number of layers and the number of layers, and TPMI.

DESCRIPTION OF EMBODIMENTS (Repetitive Transmissions)

Figure 2A:
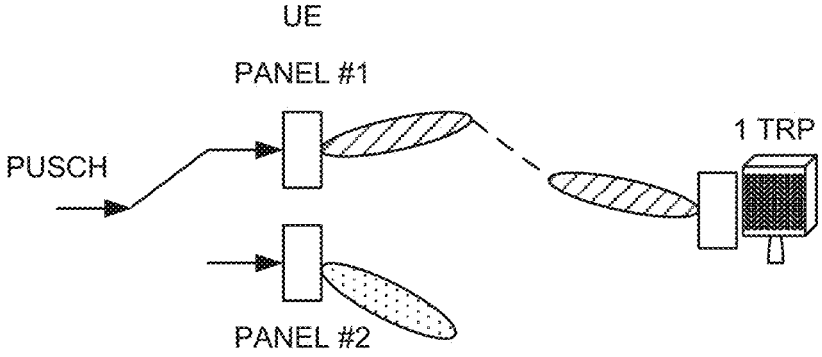
FIG. 2A to 2C are diagrams to show an example of PUSCH transmission using multiple panels.

In Rel. 15, repetitive transmissions are supported for data transmission. For example, a base station (network (NW) or gNB) may perform repetitive transmissions of DL data (e.g., downlink shared channel (PDSCH)) a certain number of times. Alternatively, a UE may perform repetitions of UL data (e.g., uplink shared channel (PUSCH)) a certain number of times.

Repetitive PUSCH transmissions of a certain number of times may be scheduled for the UE by a single piece of DCI. The number of repetitions is also referred to as a repetition factor K or an aggregation factor K.

The n-th repetition is also referred to as the n-th transmission occasion and so on, and may be identified by a repetition index k ($0 \le k \le K-1$). The repetitive transmissions may be applied to a PUSCH (e.g., a dynamic grant-based PUSCH) dynamically scheduled by DCI, or may be applied to a configured grant-based PUSCH.

The UE semi-statically receives information (e.g., aggregationFactorUL or aggregationFactorDL) indicating the repetition factor K by using higher layer signaling. Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), and the like.

The UE controls PDSCH reception processing (e.g., at least one of reception, demapping, demodulation, and decoding) or PUSCH transmission processing (e.g., at least one of transmission, mapping, modulation, and coding) in K pieces of consecutive slots on the basis of at least one field value (or information indicated by the field value) below in DCI:

assignment of time domain resources (e.g., start symbols, the number of symbols in each slot, or the like), assignment of frequency domain resources (e.g., certain number of resource blocks (RBs) or certain number of resource block groups (RBGs)), modulation and coding scheme (MCS) index, configuration of PUSCH demodulation reference signal (DMRS), and PUSCH spatial relation information (spatial relation info) or transmission configuration indication (Transmission Configuration Indication or Transmission Configuration Indicator (TCI)) state (TCI state (TCI-state)).

Identical symbol assignment may be applied between K pieces of consecutive slots. The UE may determine symbol assignment in each slot on the basis of a start symbol S and the number of symbols L (e.g., a Strat and Length Indicator (SLIV)) determined on the basis of a value m of a certain field (e.g., a time domain resource assignment (TDRA) field) in the DCI. Note that the UE may determine the first slot on the basis of K2 information determined on the basis of the value m of the certain field (e.g., the TDRA field) of the DCI.

On the other hand, between K pieces of consecutive slots, redundancy versions (RVs) applied to a TB based on identical data may be identical to each other, or may be at least partially different from each other. For example, an RV applied to the TB in the n-th slot (transmission occasion or repetition) may be determined on the basis of a value of a certain field (e.g., an RV field) in the DCI.

In Rel. 15, PUSCHs can be repetitively transmitted in a plurality of slots (in units of slots). In Rel. 16 (or later versions), repetitive PUSCH transmissions in units shorter than slots (e.g., units of sub-slots, units of mini-slots, or units of a certain number of symbols) are supported.

The UE may determine symbol assignment for PUSCH transmission (e.g., a PUSCH with k=0) in a certain slot on the basis of a start symbol S and the number of symbols L determined on the basis of a value m of a certain field (e.g., a TDRA field) in DCI for the PUSCH. Note that the UE may determine the certain slot on the basis of Ks information determined on the basis of the value m of the certain field (e.g., the TDRA field) of the DCI.

The UE may dynamically receive information (e.g., numberofrepetitions) indicating the repetition factor K by using downlink control information. The repetition factor may be determined on the basis of the value m of the certain field (e.g., the TDRA field) in the DCI. For example, a table in which correspondence between a bit value notified by the DCI and the repetition factor K, start symbol S, and number of symbols L is defined may be supported.

Slot-based repetitive transmissions may be referred to as a repetitive transmission type A (e.g., PUSCH repetition Type A), and sub-slot-based repetitive transmissions may be referred to as a repetitive transmission type B (e.g., PUSCH repetition Type B).

Application of at least one of the repetitive transmission type A and the repetitive transmission type B may be configured for the UE. For example, a repetitive transmission type applied by the UE may be notified to the UE from the base station with use of higher layer signaling (e.g., PUSCHRepTypeIndicator).

Either of the repetitive transmission type A and the repetitive transmission type B may be configured for the UE for each DCI format to schedule the PUSCH.

For example, with respect to a first DCI format (e.g., DCI format 0_1), when higher layer signaling (e.g., PUSCHRep-TypeIndicator-AorDCIFormat0_1) is configured to the repetitive transmission type B (e.g., PUSCH-RepTypeB), the UE applies the repetitive transmission type B to repetitive PUSCH transmissions scheduled by the first DCI format. In other cases (e.g., when PUSCH-RepTypeB is not configured or when PUSCH-RepTypeA is configured), the UE applies the repetitive transmission type A to repetitive PUSCH transmissions scheduled by the first DCI format. (PUSCH Precoder)

For NR, it is under study that the UE supports at least one of codebook-based (CB-based) transmission and non-codebook-based (NCB-based) transmission.

For example, it is under study that the UE judges a precoder (precoding matrix) for at least one of CB-based and NCB-based uplink shared channel (Physical Uplink Shared Channel (PUSCH)) transmission by using at least a sounding reference signal (SRS) resource indicator (SRI).

In a case of CB-based transmission, the UE may determine the precoder for PUSCH transmission on the basis of the SRI, a transmitted rank indicator (TRI), a transmitted precoding matrix indicator (TPMI), and the like. In a case of NCB-based transmission, the UE may determine the precoder for PUSCH transmission on the basis of the SRI.

The SRI, TRI, TPMI, and the like may be notified to the UE with use of downlink control information (DCI). The SRI may be designated by an SRS Resource Indicator field (SRI field) in the DCI, or may be designated by a parameter "srs-ResourceIndicator" included in an RRC information element "ConfiguredGrantConfig" for a configured grant PUSCH. The TRI and TPMI may be designated by a precoding information and number of layers field ("Precoding information and number of layers" field) in the DCI.

The UE may report UE capability information related to a precoder type, and a precoder type based on the UE capability information may be configured for the UE by higher layer signaling from the base station. The UE capability information may be precoder type information (which may be represented by an RRC parameter "pusch-TransCoherence") used by the UE for PUSCH transmission.

In the present disclosure, the higher layer signaling may be, for example, any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), or the like.

The UE may determine the precoder used for PUSCH transmission on the basis of precoder type information (which may be represented by an RRC parameter "codebookSubset") included in PUSCH configuration information ("PUSCH-Config" information element of RRC signaling) notified by the higher layer signaling. A subset of PMIs designated by the TPMI may be configured for the UE by the codebookSubset.

Note that the precoder type may be designated by any one or combinations of at least two of fully coherent (full coherent or coherent), partially coherent (partial coherent), and non-coherent (non coherent) (the combinations may be represented by, for example, a parameter such as "fully, partially, and non-coherent (fullyAndPartialAndNonCoherent)," or "partially and non-coherent (partialAndNonCoherent)").

The fully coherent may mean that all antenna ports used for transmission are synchronized (which may be expressed as it is possible to perform phase matching, it is possible to perform phase control for each coherent antenna port, it is possible to appropriately apply a precoder for each coherent antenna port, and so on). The partially coherent may mean that some ports of antenna ports used for transmission are synchronized but the some ports and another port are not synchronized. The non-coherent may mean that each antenna port used for transmission is not synchronized.

Note that the UE that supports a fully coherent precoder type may be assumed to support a partially coherent and non-coherent precoder type. The UE that supports a partially coherent precoder type may be assumed to support a non-coherent precoder type.

The precoder type may be interpreted as coherency, PUSCH transmission coherence, a coherent type, a coherence type, a codebook type, a codebook subset, a codebook subset type, and so on.

The UE may determine a precoding matrix corresponding to a TPMI index obtained from DCI (e.g., DCI format 0_1; the same applies hereinafter) to schedule UL transmission on the basis of a plurality of precoders (which may be referred to as precoding matrixes, codebooks, and so on) for CB-based transmission.

FIG. 1 is a diagram to show an example of an association between the precoder type and the TPMI index. FIG. 1 corresponds to a table for a precoding matrix W for a single layer (rank 1) transmission using 4 antenna ports in DFT-s-OFDM (Discrete Fourier Transform spread OFDM or transform precoding is enabled).

In FIG. 1, when a precoder type (codebookSubset) is fully and partially and non-coherent (fullyAndPartialAndNonCoherent), any one of TPMIs 0 to 27 is notified to the UE for the single layer transmission. When the precoder type is partially and non-coherent (partialAndNonCoherent), any one of TPMIs 0 to 11 is configured for the UE for the single layer transmission. When the precoder type is non-coherent (nonCoherent), any one of TPMIs 0 to 3 is configured for the UE for the single layer transmission.

Note that as shown in FIG. 1, a precoding matrix in which only one of respective elements of each row is not zero may be referred to as a non-coherent codebook. A precoding matrix in which only a certain number of respective elements (except all of the elements) of each row is not zero may be referred to as a partially coherent codebook. A precoding matrix in which all elements of each row are not zero may be referred to as a fully coherent codebook.

The non-coherent codebook and the partially coherent codebook may be referred to as an antenna selection precoder. The fully coherent codebook may be referred to as a non-antenna selection precoder.

Note that in the present disclosure, the partially coherent codebook may correspond to a codebook obtained by removing a codebook corresponding to a TPMI designated for the UE for which a non-coherent codebook subset (e.g., an RRC parameter "codebookSubset"="nonCoherent") is configured from codebooks (precoding matrixes) corresponding to a TPMI designated by DCI for codebook-based transmission for the UE for which a partially coherent codebook subset (e.g., an RRC parameter "codebookSubset"="partialAndNonCoherent") is configured (in other words, a codebook with TPMIs=4 to 11 in a case of single layer transmission with 4 antenna ports).

Note that in the present disclosure, the fully coherent codebook may correspond to a codebook obtained by removing a codebook corresponding to a TPMI designated for the UE for which a partially coherent codebook subset (e.g., an RRC parameter "codebookSubset"="partialAndNonCoherent") is configured from codebooks (precoding matrixes) corresponding to a TPMI designated by DCI for codebook-based transmission for the UE for which a fully coherent codebook subset (e.g., an RRC parameter "codebookSubset"="fullyAndPartialAndNonCoherent") is configured (in other words, a codebook with TPMIs=12 to 27 in a case of single layer transmission with 4 antenna ports).

(Spatial Relation for SRS and PUSCH)

The UE may receive information (SRS configuration information, for example, a parameter in an RRC control element "SRS-Config") used for transmission of a reference signal for measurement (e.g., a sounding reference signal (SRS)).

Specifically, the UE may receive at least one of information related to one or a plurality of SRS resource sets (SRS resource set information, for example, an RRC control element "SRS-ResourceSet") and information related to one or a plurality of SRS resources (SRS resource information, for example, an RRC control element "SRS-Resource").

One SRS resource set may be related to a certain number of SRS resources (a certain number of SRS resources may be grouped together). Each SRS resource may be identified by an SRS resource identifier (SRS Resource Indicator (SRI)) or an SRS resource ID (Identifier).

The SRS resource set information may include an SRS resource set ID (SRS-ResourceSetId), a list of SRS resource IDs (SRS-ResourceId) used in the resource set, an SRS resource type, or information about SRS usage.

Here, the SRS resource type may indicate any one of a periodic SRS (P-SRS), a semi-persistent SRS (SP-SRS), and an aperiodic SRS (A-SRS or AP-SRS). Note that the UE may periodically (or, after activation, periodically) transmit the P-SRS and SP-SRS, and may transmit the A-SRS on the basis of an SRS request from DCI.

The usage (an RRC parameter "usage" or an L1 (Layer-1) parameter "SRS-SetUse") may be, for example, beam management (beamManagement), codebook-based transmission (codebook (CB)), non-codebook-based transmission (non-Codebook (NCB)), antenna switching (antennaSwitching), or the like. An SRS for codebook-based transmission or non-codebook-based transmission usage may be used for determination of a precoder for codebook-based or non-codebook-based PUSCH transmission based on the SRI.

For example, in a case of codebook-based transmission, the UE may determine the precoder for the PUSCH transmission on the basis of the SRI, transmitted rank indicator (TRI), and transmitted precoding matrix indicator (TPMI). In a case of non-codebook-based transmission, the UE may determine the precoder for the PUSCH transmission on the basis of the SRI.

The SRS resource information may include an SRS resource ID (SRS-ResourceId), the number of SRS ports, an SRS port number, a transmission comb, SRS resource mapping (e.g., time and/or frequency resource location, resource offset, resource periodicity, the number of repetitions, the number of SRS symbols, SRS bandwidth, or the like), hopping-related information, an SRS resource type, a sequence ID, SRS spatial relation information, or the like.

The SRS spatial relation information (e.g., an RRC information element "spatialRelationInfo") may indicate information about a spatial relation between a certain reference signal and the SRS. The certain reference signal may be at least one of a synchronization signal/broadcast channel (Synchronization Signal/Physical Broadcast Channel (SS/PBCH)) block, a channel state information reference signal (CSI-RS), and an SRS (e.g., another SRS). The SS/PBCH block may be referred to as a synchronization signal block (SSB).

The SRS spatial relation information may include, as an index of the above-described certain reference signal, at least one of an SSB index, a CSI-RS resource ID, and an SRS resource ID.

Note that in the present disclosure, an SSB index, an SSB resource ID, and an SSBRI (SSB Resource Indicator) may be interchangeably interpreted. A CSI-RS index, a CSI-RS resource ID, and a CRI (CSI-RS Resource Indicator) may also be interchangeably interpreted. An SRS index, an SRS resource ID, and an SRI may also be interchangeably interpreted.

The SRS spatial relation information may include a serving cell index, a BWP index (BWP ID), or the like corresponding to the above-described certain reference signal.

In NR, uplink signal transmission may be controlled on the basis of the presence or absence of beam correspondence (BC). The BC may be, for example, a capability of a certain node (e.g., the base station or UE) to determine a beam used for signal transmission (transmit beam or Tx beam) on the basis of a beam used for signal reception (receive beam or Rx beam).

Note that the BC may be referred to as transmit/receive beam correspondence (Tx/Rx beam correspondence), beam reciprocity, beam calibration, calibrated/non-calibrated, reciprocity calibrated/non-calibrated, a level of correspondence, a level of coincidence, and so on.

For example, when the BC is absent, the UE may transmit an uplink signal (e.g., a PUSCH, a PUCCH, an SRS, or the like) by using a beam (spatial domain transmission filter) identical to that for an SRS (or SRS resource) indicated from the base station on the basis of a measurement result of one or more SRSs (or SRS resources).

On the other hand, when the BC is present, the UE may transmit an uplink signal (e.g., a PUSCH, a PUCCH, an SRS, or the like) by using a beam (spatial domain transmission filter) identical or corresponding to a beam (spatial domain reception filter) used for reception of a certain SSB or CSI-RS (or CSI-RS resources).

With respect to a certain SRS resource, when spatial relation information related to an SSB or CSI-RS and an SRS is configured (e.g., when the BC is present), the UE may transmit the SRS resource by using the same spatial domain filter (spatial domain transmission filter) as a spatial domain filter (spatial domain reception filter) for reception of the SSB or CSI-RS. In this case, the UE may assume that a UE receive beam for the SSB or CSI-RS and a UE transmit beam for the SRS are the same.

With respect to a certain SRS (target SRS) resource, when spatial relation information related to another SRS (reference SRS) and the SRS (target SRS) is configured (e.g., when the BC is absent), the UE may transmit the target SRS resource by using the same spatial domain filter (spatial domain transmission filter) as a spatial domain filter (spatial domain transmission filter) for transmission of the reference SRS. In other words, in this case, the UE may assume that a UE transmit beam for the reference SRS and a UE transmit beam for the target SRS are the same.

The UE may determine, on the basis of a value of a certain field (e.g., an SRS resource identifier (SRI) field) in DCI (e.g., DCI format 0_1), a spatial relation for a PUSCH scheduled by the DCI. Specifically, the UE may use, for PUSCH transmission, spatial relation information (e.g., an RRC information element "spatialRelationInfo") about an SRS resource determined on the basis of the value of the certain field (e.g., the SRI).

When codebook-based transmission is used for the PUSCH, two SRS resources may be configured for the UE by RRC, and one of the two SRS resources may be indicated for the UE by DCI (1-bit certain field). When non-codebook-based transmission is used for the PUSCH, four SRS resources may be configured for the UE by the RRC, and one of the four SRS resources may be indicated for the UE by DCI (2-bit certain field). RRC reconfiguration is necessary for use of a spatial relation other than the two or four spatial relations configured by the RRC.

Note that a DL-RS is configurable for spatial relations for SRS resources used for the PUSCH. For example, with respect to SP-SRSs, spatial relations for a plurality (e.g., up to 16 pieces) of SRS resources are configured for the UE by RRC, and one of the plurality of the SRS resources can be indicated by a MAC CE.

(UL TCI State)

For Rel. 16 NR, using a UL TCI state as a method for indicating a UL beam is under study. Notification of the UL TCI state is similar to notification of a UE DL beam (DL TCI state). Note that the DL TCI state and a TCI state for a PDCCH/PDSCH may be interchangeably interpreted.

A channel/signal (which may be referred to as a target channel/RS) for which the UL TCI state is configured (designated) may be, for example, at least one of a PUSCH (DMRS for the PUSCH), a PUCCH (DMRS for the PUCCH), a random access channel (Physical Random Access Channel (PRACH)), an SRS, and the like.

For example, an RS (source RS) being in a QCL relationship with the channel/signal may be a DL RS (e.g., an SSB, a CSI-RS, a TRS, or the like), or may be a UL RS (e.g., an SRS, an SRS for beam management, or the like).

The RS being in a QCL relationship with the channel/signal in the UL TCI state may be associated with a panel ID for reception or transmission of the RS. The association may be explicitly configured (or designated) by higher layer signaling (e.g., RRC signaling, a MAC CE, or the like), or may be implicitly judged.

Correspondence between the RS and the panel ID may be configured by being included in UL TCI state information, or may be configured by being included in at least one of resource configuration information, spatial relation information, and the like about the RS.

QCL types indicated by the UL TCI state may be existing QCL types A to D, may be another QCL type, or may include certain spatial relations, related antenna ports (port indices), or the like.

When a related panel ID is designated (e.g., designated by DCI) with respect to UL transmission, the UE may perform the UL transmission by using a panel corresponding to the panel ID. The panel ID may be associated with the UL TCI state, and when the UL TCI state is designated (or activated) with respect to a certain UL channel/signal, the UE may identify, in accordance with a panel ID related to the UL TCI state, a panel used for transmission of the UL channel/signal. (Multi-Panel Transmission)

<Transmission Scheme>

In a UE of Rel. 15 and Rel. 16, only one beam and panel are used for UL transmission at one timing (FIG. 2A). In Rel. 17 (or later versions), for improvement in UL throughput and reliability, simultaneous UL transmission with multiple beams and multiple panels for one or more TRPs is under study. Hereinafter, simultaneous PUSCH transmission will be described, but similar processing may be performed for a PUCCH.

Figure 2B:
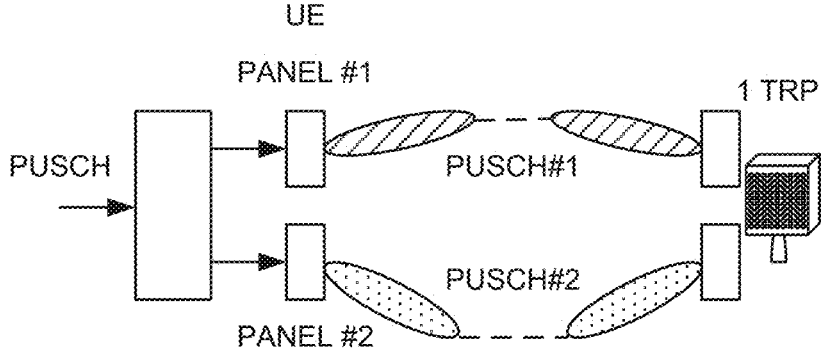
Figure 2C:
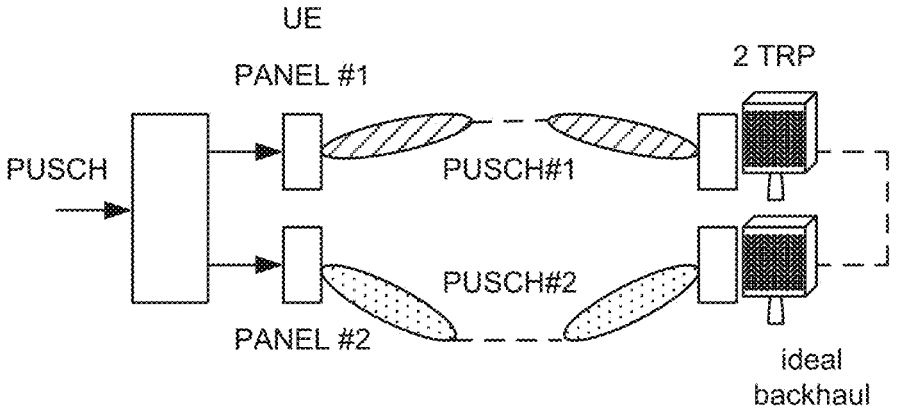

For simultaneous UL transmission using multiple beams and multiple panels, reception by one TRP having the multiple panels (FIG. 2B) or reception by two TRPs having an ideal backhaul (FIG. 2C) is under study. A single PDCCH for scheduling of multiple PUSCHs (e.g., simultaneous transmission of PUSCH #1 and PUSCH #2) is under study. Support for panel-specific transmission and introduction of a panel ID are under study.

The base station may configure or indicate the panel-specific transmission for UL transmission by using a UL TCI or panel ID. The UL TCI (UL TCI state) may be based on signaling similar to DL beam indication supported in Rel. 15. The panel ID may be implicitly or explicitly applied to transmission of at least one of a target RS resource or target RS resource set, a PUCCH, an SRS, and a PRACH. When the panel ID is explicitly notified, the panel ID may be configured in at least one (e.g., DL RS resource configuration or spatial relation information) of a target RS, a target channel, and a reference RS.

A multi-panel UL transmission scheme or a multi-panel UL transmission scheme candidate may be at least one of the following schemes 1 to 3 (multi-panel UL transmission schemes 1 to 3). Only one of the schemes 1 to 3 may be supported. A plurality of schemes including at least one of the schemes 1 to 3 may be supported, and one of the plurality of the schemes may be configured for the UE.

<<Scheme 1>>

Coherent Multi-Panel UL Transmission

Multiple panels may be mutually synchronized. All layers are mapped to all panels. Multiple analog beams are indicated. An SRS resource indicator (SRI) field may be enhanced. This scheme may use at most 4 layers for UL.

Figure 3A:
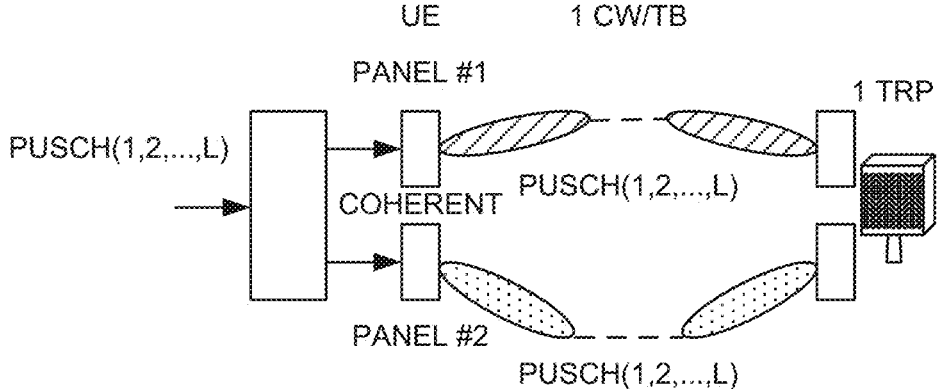
FIG. 3A to 3C are diagrams to show an example of schemes 1 to 3 for simultaneous UL transmission using multiple panels.

In an example of FIG. 3A, the UE maps one codeword (CW) or one transport block (TB) to L pieces of layers (PUSCH (1, 2, . . . , L)) to transmit L pieces of layers from each of two panels. Panel #1 and panel #2 are coherent. The scheme 1 can obtain diversity gain. A total number of layers in the two panels is 2L. When a maximum value of the total number of layers is 4, a maximum value of the number of layers in one panel is 2.

<<Scheme 2>>

Non-Coherent Multi-Panel UL Transmission with One Codeword (CW) or Transport Block (TB)

Multiple panels may not be synchronized. Different layers are mapped to one CW or TB for PUSCHs from different panels and multiple panels. A layer corresponding to one CW or TB may be mapped to the multiple panels. This scheme may use at most 4 layers or at most 8 layers for UL. When supporting at most 8 layers, this scheme may support one CW or TB using at most 8 layers.

Figure 3B:
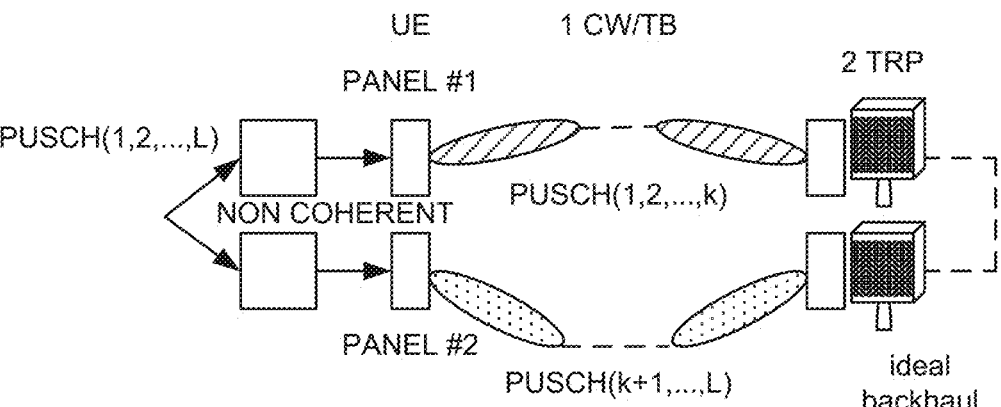

In an example of FIG. 3B, the UE maps one CW or one TB to k pieces of layers (PUSCH (1, 2, . . . , k)) and L–k pieces of layers (PUSCH (k+1, k+2, . . . , L)) to transmit k pieces of layers from panel #1 and transmit L–k pieces of layers from panel #2. The scheme 2 can obtain multiplexing and diversity gain. A total number of layers in the two panels is L.

<<Scheme 3>>

Non-Coherent Multi-Panel UL Transmission with Two CWs or TBs

Multiple panels may not be synchronized. Different layers are mapped to two CWs or TBs for PUSCHs from different panels and multiple panels. A layer corresponding to one CW or TB may be mapped to one panel. Layers corresponding to a plurality of CWs or TBs may be mapped to different panels. This scheme may use at most 4 layers or at most 8 layers for UL. When supporting at most 8 layers, this scheme may support at most 4 layers per CW or TB.

Figure 3C:
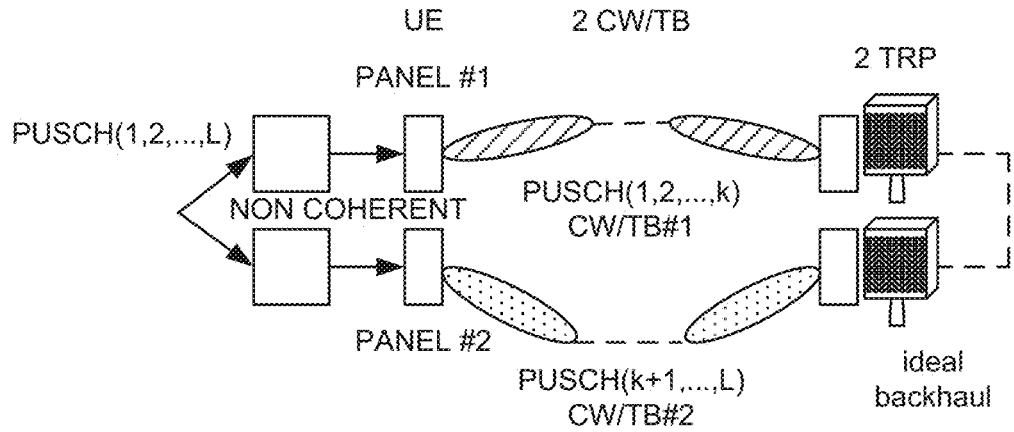

In an example of FIG. 3C, the UE maps CW #1 or TB #1 to k pieces of layers (PUSCH (1, 2, . . . , k)) and maps CW #2 or TB #2 to L–k pieces of layers (PUSCH (k+1, k+2, . . . , L)) out of the 2 CWs or 2 TBs to transmit k pieces of layers from panel #1 and transmit L–k pieces of layers from panel #2. The scheme 3 can obtain multiplexing and diversity gain. A total number of layers in the two panels is L.

<DCI Enhancement>

When the above-mentioned schemes 1 to 3 are employed, enhancement of existing DCI may be performed. For example, at least one of the following options 1 to 6 may be employed.

[Option 1]

For the scheme 1, multiple PUSCHs may be indicated (scheduled) by a single PDCCH (DCI). For indication of the multiple PUSCHs, an SRI field may be enhanced. For indication of the multiple PUSCHs from multiple panels, multiple SRI fields in the DCI may be used. For example, the DCI to schedule two PUSCHs may include two SRI fields.

SRI field enhancement for the scheme 2 may be different from the SRI field enhancement for the scheme 1 in the following respects.

With respect to layers 1, 2, . . . , k of L pieces of layers, the UE may use the SRI (SRS #i) indicated first by an SRI field in the DCI for a spatial filter for UL transmission from panel 1. With respect to the remaining layers k+1, k+2, . . . , L of L pieces of layers, the UE may use the SRI (SRS #j) indicated second by the SRI field in the DCI for a spatial filter for UL transmission from panel 2. k may be in accordance with a predefined rule, or may be explicitly indicated by the DCI.

For SRI field enhancement for the scheme 3 to support two CWs or TBs for different TRPs, at least one of a modulation and coding scheme (MCS) field, a precoding information and number of layers field, a field for a transmission power control (TPC) command for a scheduled PUSCH, a frequency domain resource assignment field, and a time domain resource assignment field, included in the DCI, may be enhanced for indication of multiple PUSCHs in addition to the SRI field enhancement for the scheme 2. The different TRPs may have different path losses, or may have different SINRs.

[Option 2]

Information related to the repetitive PUSCH transmission types may be notified or configured for the UE by higher layer signaling. For example, the UE may apply repetitive transmission type A when repetitive transmission type B (e.g., PUSCH-RepTypeB) is not configured by the higher layer signaling. The repetitive transmission types may be configured for each DCI format (or PUSCH type). The PUSCH type may include a dynamic grant-based PUSCH and a configured grant-based PUSCH.

Information related to a repetition factor, information related to PUSCH assignment, information related to a spatial relation (or precoder) used for PUSCH transmission, and information related to a redundancy version used for the PUSCH transmission may be notified to the UE by the DCI or a combination of the DCI and a higher layer parameter.

With respect to the information related to a repetition factor (e.g., K) and the information related to PUSCH assignment (e.g., start symbol S and PUSCH length L), a plurality of candidates may be defined in a table, and a specific candidate may be selected by the DCI. Descriptions below will be described using, as an example, a case where the repetition factor (K) for the PUSCH is 4, but applicable repetition factors are not limited to 4.

For the information related to the spatial relation (hereinafter also described as spatial relation information), multiple candidates may be configured by higher layer signaling, and one or more pieces of spatial relation information may be activated by at least one of DCI and a MAC CE.

[Option 3]

An association between the number of bits of a TPC command field included in one piece of DCI to schedule PUSCH transmission across multiple TRPs and the TPC command field and an index (e.g., a closed-loop index) related to TPC will be described. The UE may control a plurality of PUSCH transmissions at least on the basis of the index.

The number of bits of the TPC command field included in one piece of DCI to schedule PUSCH transmission across multiple TRPs may be enhanced to a specific number (e.g., 2M) of bits as compared to the number of bits of Rel. 15/16. In the present disclosure, M may be the number of TRPs, or may be the number of SRIs capable of being indicated for the PUSCH transmission across multiple TRPs.

For example, with respect to codebook-based transmission, when an SRI for PUSCH transmission to two TRPs is indicated by DCI, the TPC command field may be enhanced to 4 bits.

An association between the enhanced TPC command field and a specific index (e.g., the closed-loop index) related to TPC may be in accordance with at least one of association 1 or association 2 below. Hereinafter, the closed-loop index will be described, but the closed-loop index of the present disclosure may be interpreted as an arbitrary specific index related to TPC.

[[Association 1]]

When the enhanced TPC command field is separated by a specific number of bits (e.g., 2 or 4 bits or the like), the x-th (x is an arbitrary integer) smallest (or largest) specific number of bits may be associated with a combination of the x-th SRI/SRI indicated by the DCI.

[[Association 2]]

When the enhanced TPC command field is separated by a specific number of bits (e.g., 2 bits), the x-th smallest (or largest) specific number of bits may be associated with an SRI corresponding to the x-th smallest (or largest) closed-loop index indicated by the DCI.

[Option 4]

When repetitive PUSCH transmissions across multiple TRPs is performed, the same number of antenna ports may be configured/indicated for different TRPs (different PUSCHs). In other words, the same number of antenna ports may be commonly configured/indicated for a plurality of TRPs (a plurality of PUSCHs). In this case, the UE may assume that the same number of antenna ports is commonly configured/indicated for the plurality of the TRPs (the plurality of the PUSCHs). In this case, the UE may determine a TPMI for PUSCH transmission in accordance with at least one of indication method 1-1 or indication method 1-2 described below.

[[Indication Method 1-1]]

A precoding information and number of layers field included in scheduling DCI may have the same number of bits as the number of bits defined in Rel. 15/16. In this case, one precoding information and number of layers field included in one piece of DCI may be indicated for the UE. In other words, the UE may determine the TPMI on the basis of one precoding information and number of layers field included in one piece of DCI. Subsequently, the UE may apply the precoding information and number of layers field/TPMI to PUSCH transmission with different TRPs.

[[Indication Method 1-2]]

The precoding information and number of layers field included in scheduling DCI may be the number of bits enhanced to a specific number as compared to Rel. 15/16. The specific number may be expressed by X×M.

The above-described X may be determined on the basis of a size of the precoding information and number of layers field included in the DCI for performing UL transmission to one TRP. For example, the above-described X may be determined on the basis of at least one of the number of antenna ports and a number configured by a specific higher layer parameter (e.g., at least one of ul-FullPowerTransmission, maxRank, codebookSubset, and transformPrecoder).

The above-described X may be a fixed value. The UE may assume that the above-described X has a fixed size regardless of the number of antenna ports configured by a higher layer. The UE may also assume that the above-described X has a fixed size regardless of a value of a number of antenna ports field (the number of antenna ports indicated by the number of antenna ports field).

When repetitive PUSCH transmissions across multiple TRPs is performed, a different/same number of antenna ports may be configured/indicated for different TRPs (different PUSCHs). In other words, the number of antenna ports may be separately configured/indicated for a plurality of TRPs (a plurality of PUSCHs). In this case, the UE may assume that the number of antenna ports is separately configured/indicated for each of the plurality of the TRPs (the plurality of the PUSCHs). In this case, the UE may determine a TPMI for PUSCH transmission in accordance with indication method 2 described below.

[[Indication Method 2]]

The precoding information and number of layers field included in scheduling DCI may be the number of bits enhanced to a specific number as compared to Rel. 15/16. The specific number may be expressed by $X_1 + X_2 + \ldots + X_M$.

The above-described $X_i$ (i is an arbitrary integer from 1 to M) may be determined on the basis of a size of the precoding information and number of layers field included in the DCI for performing UL transmission to the i-th TRP. For example, the above-described $X_i$ may be determined on the basis of at least one of the number of antenna ports and a number configured by a specific higher layer parameter (e.g., at least one of ul-FullPowerTransmission, maxRank, code-bookSubset, and transformPrecoder). The above-described $X_i$ may be configured as a fixed value.

The above-described M may be the number of TRPs, or may be the number of pieces of spatial relation information (SRIs) capable of being indicated for the PUSCH transmission across multiple TRPs.

[Option 5]

The UE may determine an SRI applied to a PUSCH on the basis of at least one of an SRI field in DCI to schedule the PUSCH and a CORESET pool index of a control resource set (Control Resource SET (CORESET)) for the DCI (for, for example, detecting the DCI).

The UE may determine, on the basis of a plurality of SRI fields included in DCI to schedule a plurality of PUSCHs, an SRI applied to each of the PUSCHs.

The UE may determine, on the basis of one SRI field included in DCI to schedule a plurality of PUSCHs, an SRI applied to each of the PUSCHs.

The UE may determine PUSCH transmit power on the basis of an SRI field in DCI to schedule the PUSCH. For example, the UE may determine a parameter related to a PUSCH transmission power control (TPC) on the basis of the SRI field in DCI to schedule the PUSCH.

[Option 6]

The UE may determine to perform either repetitive trans-missions for a single TRP or repetitive transmissions for multiple TRPs on the basis of a specific field included in DCI.

For example, when the field included in the DCI indicates application of either a first SRI field or a second SRI field out of a plurality of (e.g., two) SRI fields (the first SRI field and the second SRI field), the UE may determine that a plurality of repetitive PUSCH transmissions are performed in an SRI to be applied. In other words, when the field included in the DCI indicates application of one SRI field out of a plurality of SRI fields, the UE may determine that repetitive PUSCH transmissions in the single TRP are performed.

For example, when the field included in the DCI indicates application of both a first SRI field and a second SRI field out of a plurality of (e.g., two) SRI fields (the first SRI field and the second SRI field), the UE may also determine that a plurality of repetitive PUSCH transmissions are performed in a plurality of SRIs (e.g., multiple TRPs). In other words, when the field included in the DCI indicates application of the plurality of the SRI fields, the UE may determine that repetitive PUSCH transmissions in the multiple TRPs are performed.

(Issue)

As mentioned above, DCI enhancement and the like related to examples of the schemes 1 to 3 are under study. However, details of an operation for simultaneous UL transmission by multiple beams and multiple panels have not been fully studied. For example, it is conceivable that a plurality (multiple sets) of SRIs/TPMIs/TPCs are indicated. However, how to map DMRS ports for each PUSCH to each PUSCH/SRI/TPMI/TPC has not been fully studied. Unless the simultaneous UL transmission using the multiple panels is appropriately performed, system performance degrada-tion, such as throughput reduction, may occur. Thus, the inventors of the present invention came up with the idea of a method for the UE for appropriately performing simulta-neous UL transmission with multiple panels.

Hereinafter, embodiments according to the present dis-closure will be described in detail with reference to the drawings. The radio communication methods according to respective embodiments may each be employed individu-ally, or may be employed in combination.

In the present disclosure, a beam, a panel, a UE panel, an RS port group, a DMRS port group, an SRS port group, an RS resource group, a DMRS resource group, an SRS resource group, a beam group, a TCI state group, a spatial relation group, an SRS resource indicator (SRI) group, an antenna port group, an antenna group, a CORESET group, and a CORESET pool may be interchangeably interpreted.

The panel may be associated with at least one of a panel ID, a UL TCI state, a UL beam, an L beam, a DL RS resource, and spatial relation information.

In the present disclosure, a spatial relation, a spatial configuration, spatial relation information, spatialRelation-Info, an SRI, an SRS resource, a precoder, a UL TCI, a TCI state, a Unified TCI, QCL, and the like may be interchange-ably interpreted.

In the present disclosure, an index, an ID, an indicator, and a resource ID may be interchangeably interpreted.

In the present disclosure, a single piece of DCI (sDCI), a single PDCCH, a multi-TRP (MTRP) system based on the single piece of DCI, sDCI-based MTRP, scheduling of a plurality of PUSCHs (corresponding to different SRIs) with one piece of DCI, sDCI-based MTRP transmission, and activation of two TCI states on at least one TCI codepoint may be interchangeably interpreted.

In the present disclosure, multiple DCI (mDCI), multiple PDCCHs, a multi-TRP system based on the multiple DCI, mDCI-based MTRP, mDCI-based MTRP transmission, use of the multiple DCI for MTRP, scheduling of a plurality of PUSCHs (corresponding to different SRIs) with two pieces of DCI, and configuration of two CORESET pool indices or CORESET pool index=1 (or a value being 1 or more) may be interchangeably interpreted.

In the present disclosure, activation, deactivation, indica-tion (or designation (indicate)), selection, configuration (configure), update, determination (determine), and the like may be interchangeably interpreted.

In the present disclosure, repetition (one repetition), an occasion, and a channel may be interchangeably interpreted. In the present disclosure, UL data, a TB, a CW, and UCI may be interchangeably interpreted.

Note that in the present disclosure, "A/B" may be inter-preted as "at least one of A and B." A transmission scheme and a new transmission scheme of the present disclosure may mean at least one of the above-mentioned schemes 1 to 3.

(Radio Communication Method)

In a first embodiment and a second embodiment, a UE receives a configuration related to transmission of a physical uplink shared channel (PUSCH) by using higher layer signaling (RRC). The UE simultaneously transmits, on the basis of the configuration, the PUSCH by using a plurality of coherent (the first embodiment) or non-coherent (the second embodiment) panels.

First Embodiment

A PUSCH generation (transmission) operation in a case where the coherent multi-panel UL transmission described in the above-mentioned scheme 1 is applied has not been fully studied. Thus, the inventors of the present invention came up with the idea of a method for appropriately per-forming PUSCH generation in a case where the coherent multi-panel UL transmission is applied. In the scheme 1, multiple TRPs may be applied, and the two panels may be panels for different TRPs.

Note that the scheme 1 may be applied in a high speed train (HST)-single frequency network (SFN). For example, a plurality of small antennas (transmission/reception points) that have the same cell ID and have a certain distance form the SFN. When moving at high speed, transmission/reception points with units of several km form one cell. Handover is performed when moving to another cell.

In NR, it is assumed that a beam transmitted from a transmission point (e.g., a Remote Radio Head (RRH)) is used in order to perform communication with the UE included in a moving object (HST), such as a train moving at high speed. In existing systems (e.g., Rel. 15), performing communication with the moving object by transmitting one directional beam from the RRH is supported. Employing the scheme 1 allows UL reliability in moving at high speed such as the HST to be improved.

A new RRC configuration allows the UE to schedule so that two PUSCHs/CWs/TBs are simultaneously transmitted, and the two PUSCHs/CWs/TBs may be the same. Alternatively, the two PUSCHs may be regarded as one PUSCH simultaneously and repetitively transmitted.

With respect to a single DCI-based simultaneous PUSCH transmission (scheduled by a single piece of DCI), enhanced DCI as shown in <DCI Enhancement> mentioned above may be used for SRIs/TPMIs/TPCs.

In DMRS transmission for the PUSCH, the UE may, with respect to different PUSCHs/CWs/TBs, assume that a plurality of indicated SRIs (in a case of CB-based PUSCH transmission)/a plurality of indicated SRI sets (in a case of NCB-based PUSCH transmission) are applied to each DMRS port (each layer) for the PUSCH.

Any one of the following options may be applied in time/frequency resource indication for PUSCH repetition.

[Option 1]

Figure 4:
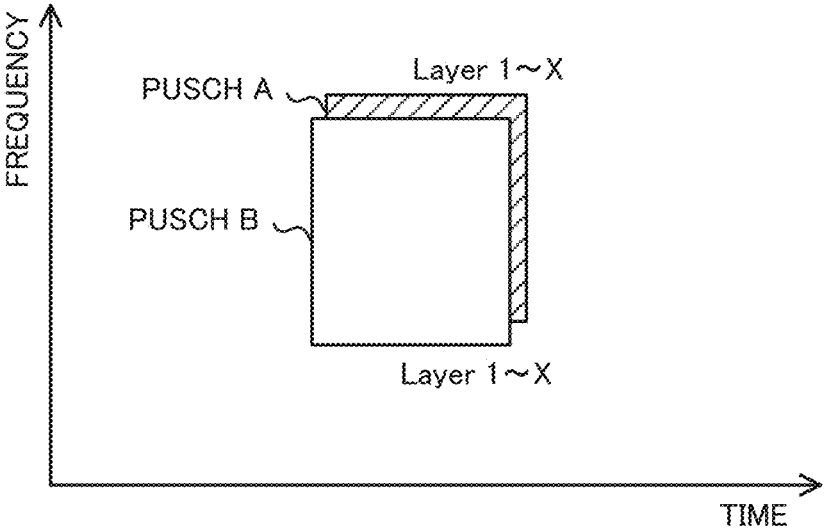
FIG. 4 is a diagram to show an example of repetitive PUSCH transmissions to which SDM is applied.

The UE may assume that repetitive PUSCH transmissions to which space division multiplexing (SDM) is applied are scheduled for the same time resource and the same frequency resource. In other words, when a plurality of coherent panels are used, the UE may transmit, in the same time resource and the same frequency resource, the repetitive PUSCH transmissions to which SDM is applied. FIG. 4 is a diagram to show an example of the repetitive PUSCH transmissions to which SDM is applied. In FIG. 4, time and frequency resources for PUSCH A and PUSCH B being repetitions are the same.

[Option 2]

Figure 5A:
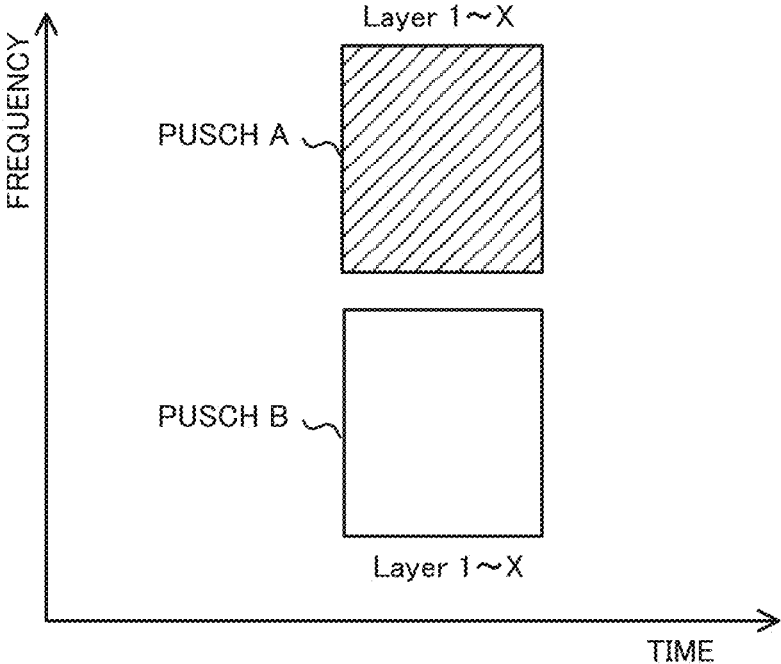
FIG. 5A is a diagram to show a first example of repetitive PUSCH transmissions to which FDM is applied.

The UE may assume that repetitive PUSCH transmissions to which frequency division multiplexing (FDM) is applied are scheduled for the same time resource and different frequency resources. In other words, when a plurality of coherent panels are used, the UE may transmit, in the same time resource and the different frequency resources, the repetitive PUSCH transmissions to which FDM is applied. FIG. 5A is a diagram to show a first example of the repetitive PUSCH transmissions to which FDM is applied. In FIG. 5A, time resources for PUSCH A and PUSCH B being repetitions are the same, and frequency resources for PUSCH A and PUSCH B are different from each other.

Figure 5B:
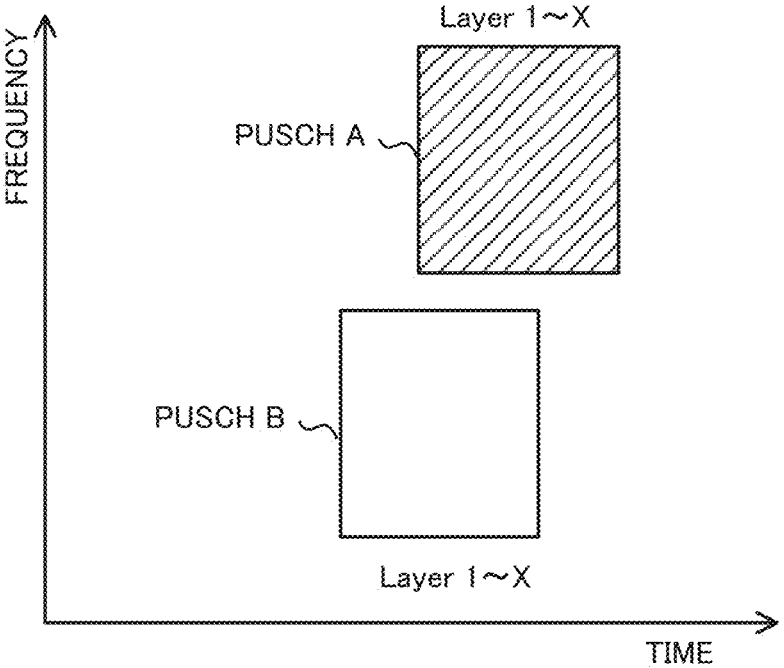
FIG. 5B is a diagram to show a second example of the repetitive PUSCH transmissions to which FDM is applied.

The UE may assume that the repetitive PUSCH transmissions to which FDM is applied are scheduled for partially (one or a plurality of symbols) overlapping time resources and different frequency resources. FIG. 5B is a diagram to show a second example of the repetitive PUSCH transmissions to which FDM is applied. In FIG. 5B, some (one or a plurality of symbols) of time resources for PUSCH A and PUSCH B being repetitions overlap with each other, and frequency resources for PUSCH A and PUSCH B are different from each other.

[Variations]

The UE may perform, in accordance with the new RRC configuration, repetitive transmissions of one PUCCH at the same time to which SDM is applied. PUCCH resources may be configured together with two TCI states/spatial relations. In DMRS transmission for a PUCCH, the UE may assume that two indicated TCI states/spatial relations are applied to each DMRS port for the PUCCH. The UE may assume that the repetitive PUCCH transmissions to which SDM is applied are scheduled for the same time/frequency resources.

According to the present embodiment, it is possible to appropriately perform a PUSCH generation (transmission) operation in a case where the coherent multi-panel UL transmission is applied.

Second Embodiment

DMRS port mapping in a case where the non-coherent multi-panel UL transmission with one/two CWs or TBs, illustrated in the scheme 2 or scheme 3 mentioned above, is applied has not been fully studied. For example, mapping of a DMRS port corresponding to each PUSCH/SRI/TPMI/TPC in a case where a plurality (multiple sets) of SRIs/TPMIs/TPCs are indicated has not been fully studied. Thus, the inventors of the present invention came up with the idea of a method for appropriately performing DMRS port mapping in a case where the non-coherent multi-panel UL transmission with one/two CWs or TBs is applied.

When a new RRC configuration is used, a UE may be scheduled so as to simultaneously transmit one or two PUSCHs/CWs/TBs having different data/layers on different beams/panels to different TRPs. When this new RRC configuration is used, the following aspects 2-1 to 2-3 may be employed when a plurality (multiple sets) of SRIs/TPMIs/TPCs are indicated in DCI to schedule the PUSCH.

In the aspects 2-1 to 2-3, when using a plurality of non-coherent panels, the UE receives downlink control information (DCI) including at least one of a sounding reference signal resource indicator (SRI), a transmitted precoding matrix indicator (TPMI), and a transmission power control command (TPC command) that correspond to a code division multiplexing (CDM) group. The UE transmits the PUSCH on the basis of the DCI. In the present disclosure, TPC and a TPC command may be interchangeably interpreted.

[Aspect 2-1]

When a DCI field "Antenna Port(s)" indicates DM-RS ports in two CDM groups, the first (the first set of) SRI/TPMI/TPC may correspond to a CDM group for the first antenna port indicated by an antenna port indication table, and the second (the second set of) SRI/TPMI/TPC may correspond to another CDM group.

[Aspect 2-2]

When the DCI field "Antenna Port(s)" indicates DM-RS ports in three CDM groups, any one of the following options 1 to 3 may be employed.

[[Option 1]]

The first (the first set of) SRI/TPMI/TPC corresponds to a CDM group for the first and second antenna ports indicated by the antenna port indication table, and the second (the second set of) SRI/TPMI/TPC corresponds to the third CDM group.

[[Option 2]]

The first (the first set of) SRI/TPMI/TPC corresponds to a CDM group for the first antenna port indicated by the antenna port indication table, and the second (the second set of) SRI/TPMI/TPC corresponds to the second and third CDM groups.

[[Option 3]]

In the new transmission scheme (e.g., at least one of the above-mentioned schemes 1 to 3) for multi-panel transmission, the UE does not assume indication by the three CDM groups.

[Aspect 2-3]

When the DCI field "Antenna Port(s)" indicates DM-RS ports in one CDM group, the following option 1 or 2 may be employed.

[[Option 1]]

The UE does not assume a DM-RS port in a CDM group indicated by a plurality (multiple sets) of SRIs/TPMIs/TPCs.

[[Option 2]]

A new codeword-layer mapping table may be defined so as to indicate two indications of layers (for two panels) for each entry and of TPMIs. FIG. 6 is an example of an association (table) between a field value of precoding information and number of layers and the number of layers and TPMI. This table has disabled transform precoding, and is a table for 4 antenna ports in a case where a maximum rank (maxRank) is 2, 3, or 4.

In this table, the number of layers in a case where only panel #1 is used is expressed as "L layers," and the number of layers k for panel #1 and the number of layers L−k for panel #2 in a case where panels #1 and #2 are used are expressed as "k+(L−k) layers." Two layers (L=2) in this table may correspond to the number of layers 1 (k=1) for panel #1 and the number of layers 1 for panel #2. In this table, the two layers may be expressed as like "2 layers," or may be expressed as like "1+1 layers."

Furthermore, in a case of one or two PUSCHs/CWs/TBs having different data/layers from different beams/panels, the UE does not assume different DM-RS configurations with respect to the actual number of front-loaded DM-RS symbols, the actual number of additional DM-RS symbols, a location of an actual DM-RS symbol, and a DM-RS configuration type.

When DCI enhancement of the single DCI-based simultaneous PUSCH transmission is performed, the examples of <DCI Enhancement> mentioned above may be applied to SRIs/TPMIs/TPCs having a plurality of indications.

[Enhancement of Table Indicating DMRS Ports]

Enhancement of a table indicating DMRS ports may be performed so that different layer mapping between two PUSCHs for two TRPs is supported. For example, when two DMRS CDM groups and a rank=3, 1+2 layers may be supported in addition to 2+1 layers.

Figure 7:
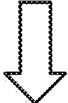
FIG. 7 is a diagram to show a first example that shows enhancement of the table related to DMRS ports.

FIG. 7 is a diagram to show a first example that shows enhancement of the table related to the DMRS ports. FIG. 7 shows enhancement of a table related to DMRS antenna ports in a case where a precoder is disabled, a DMRS type=1, a maximum length=1, and a rank=3. The maximum length is the number of OFDM symbols for a DMRS to be DL front-loaded. "value" in FIG. 7 to FIG. 10 indicates a value of the DCI field "Antenna Port(s)." In FIG. 7, "value" is 2 or 1, the number of DMRS CDM groups without data is 2, and a row with DMRS ports 0, 2, and 3 is added.

Figure 8:
FIG. 8 is a diagram to show a second example that shows enhancement of the table related to DMRS ports.

FIG. 8 is a diagram to show a second example that shows enhancement of the table related to the DMRS ports. FIG. 8 shows enhancement of a table related to DMRS antenna ports in a case where a precoder is disabled, a DMRS type=1, a maximum length=2, and a rank=3. In FIG. 8, "value" is 3, the number of DMRS CDM groups without data is 2, the DMRS ports are 0, 2, and 3, and a row with the number of front-loaded symbols 1 is added.

Figure 9:
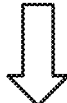
FIG. 9 is a diagram to show a third example that shows enhancement of the table related to DMRS ports.

FIG. 9 is a diagram to show a third example that shows enhancement of the table related to the DMRS ports. FIG. 9 shows enhancement of a table related to DMRS antenna ports in a case where a precoder is disabled, a DMRS type=2, a maximum length=1, and a rank=3. In FIG. 9, "value" is 3, the number of DMRS CDM groups without data is 2, and a row with DMRS ports 0, 2, and 3 is added.

Figure 10:
FIG. 10 is a diagram to show a fourth example that shows enhancement of a table related to DMRS ports.

FIG. 10 is a diagram to show a fourth example that shows enhancement of the table related to the DMRS ports. FIG. 10 shows enhancement of a table related to DMRS antenna ports in a case where a precoder is disabled, a DMRS type=2, a maximum length=2, and a rank=3. In FIG. 10, "value" is 6, the number of DMRS CDM groups without data is 2, the DMRS ports are 0, 2, and 3, and a row with the number of front-loaded symbols 1 is added.

Third Embodiment

In DCI format 0_0 or some cases (cases 1 and 2 described below), how to determine a PUSCH spatial relation in a new transmission scheme (e.g., at least one of the above-mentioned schemes 1 to 3) when spatial relations are indicated for the PUSCH has not been fully studied. For example, the PUSCH spatial relation may differ in single DCI-based PUSCH scheduling and multi-DCI-based PUSCH scheduling. Thus, the inventors of the present invention came up with the idea of a method for appropriately assuming (determining) the PUSCH spatial relation.

In the present embodiment, a UE receives downlink control information (DCI) to schedule a physical uplink shared channel (PUSCH), and assumes (determines) the PUSCH spatial relation on the basis of a physical uplink control channel resource (PUCCH resource) having the lowest identifier (ID) or a control resource set (CORESET) having the lowest identifier (ID). The UE simultaneously transmits the PUSCH by using a plurality of panels.

In the present disclosure, the PUCCH resource having the lowest ID may be interpreted as a PUCCH resource having the lowest PUCCH ID. A TCI state/spatial relation having the lowest ID may be interpreted as a TCI state/spatial relation having the lowest TCI state ID/spatial relation information ID.

[Case 1]

In PUSCH scheduling by DCI format 0_0 on a cell, the UE transmits the PUSCH in accordance with the spatial relation. The spatial relation, if available, corresponds to a dedicated PUCCH resource having the lowest ID in an active UL BWP for the cell.

In other words, in case 1, the PUSCH spatial relation is in accordance with the PUCCH resource having the lowest ID. Case 1 is applied to 3GPP Rel. 15 and Rel. 16.

[Case 2]

In PUSCH scheduling by DCI format 0_0 on the cell, when 'enabled' is set for a higher layer parameter "enableDefaultBeamPlForPUSCH0_0," PUCCH resources for the active UL BWP are not configured for the UE, and the UE is in an RRC connected mode, the UE transmits the PUSCH in accordance with the spatial relation. The spatial relation, if available, refers to an RS having QCL type D corresponding to a QCL assumption for a CORESET having the lowest ID on an active DL BWP for the cell.

In PUSCH scheduling by DCI format 0_0 on the cell, when 'enabled' is set for the higher layer parameter "enableDefaultBeamPlForPUSCH0_0," PUCCH resources for the active UL BWP are configured for the UE, spatial relations are not configured for all PUCCH resources, and the UE is in the RRC connected mode, the UE transmits the PUSCH in accordance with the spatial relation. The spatial relation, if available, in a case where CORESETs are configured in the cell refers to an RS having QCL type D corresponding to a QCL assumption for a CORESET having the lowest ID on the active DL BWP for the cell.

In other words, in case 2, the PUSCH spatial relation is in accordance with QCL of the CORESET having the lowest ID. Case 2 is applied to 3GPP Rel. 16.

[Aspect 3-1]

In a case where a new RRC parameter for indication of the above-mentioned scheme 1/2/3 related to the PUSCH is configured, it is assumed that simultaneous transmission with UL beams/panels using scheme 1/2/3 is scheduled for the UE, and when the UL is scheduled by a single piece of DCI, the UE assumes, in the above-mentioned case 1, a PUSCH spatial relation based on PUCCH resources as described in the following options 1 to 4. Note that the UE may, in case 2, perform similar processing when 'enabled' is not set for the higher layer parameter "enableDefault-BeamPlForPUSCH0_0."

[[Option 1]]

The UE may be in accordance with existing methods described in cases 1 and 2. In other words, in this case, the UE may not predict that the simultaneous transmission with the UL beams/panels is scheduled. Alternatively, the UE may predict that PUSCH transmission by one UL beam/panel is scheduled.

[[Option 2]]

The UE predicts that one or more PUCCH resources are configured together with two TCI states/spatial relations. The PUSCH spatial relation for the new transmission scheme may be determined in accordance with two TCI states/spatial relations for a PUCCH resource having the lowest ID (PUCCH resource ID) out of the one or more PUCCH resources, a TCI state/spatial relation having the lowest ID (TCI state ID/spatial relation information ID) from two PUCCH resources having the lowest ID out of the one or more PUCCH resources, or two TCI states/spatial relations having the lowest ID. In other words, DL multi-beam/panel reception from a plurality of TRPs may also be configured for a multi-panel UE for which UL multi-beam/panel simultaneous transmission is configured.

[[Option 3]]

When one or more PUCCH resources are configured together with two TCI states/spatial relations, the PUSCH spatial relation may be determined in accordance with two TCI states/spatial relations for a PUCCH resource having the lowest ID out of the one or more PUCCH resources, a TCI state/spatial relation having the lowest ID from two PUCCH resources having the lowest ID out of the one or more PUCCH resources, or two TCI states/spatial relations having the lowest ID.

When one or more PUCCH resources are configured together with one TCI state/spatial relation, the PUSCH spatial relation may be determined in accordance with two TCI states/spatial relations from two PUCCH resources having the lowest ID out of the one or more PUCCH resources or two TCI states/spatial relations having the lowest ID from two PUCCH resources.

In option 2/3, when the PUCCH resources are configured together with more than two TCI states/spatial relations, the PUSCH spatial relation may be determined in accordance with two TCI states/spatial relations for a PUCCH resource having the lowest ID, a TCI state/spatial relation having the lowest ID from two PUCCH resources having the lowest ID, or two TCI states/spatial relations having the lowest ID. For example, when repetitive transmissions are applied between MTRP, a PUCCH resource having more than two TCI states/spatial relations may exist.

[[Option 4]]

When the PUCCH resources are configured together with one TCI state/spatial relation, the PUSCH spatial relation may be determined in accordance with two PUCCH spatial relations for PUCCH resources having the lowest ID and the second lowest ID. Option 4 may be applied in a plurality of PUCCH resources having different spatial relation configurations. The PUSCH spatial relation of option 4 may be similar to that of option 2/3.

[Aspect 3-2]

In a case where a new RRC parameter for indication of the above-mentioned scheme 1/2/3 related to the PUSCH is configured, it is assumed that simultaneous transmission with UL beams/panels using scheme 1/2/3 is scheduled for the UE, and when the UL is scheduled by a single piece of DCI, the UE assumes, in the above-mentioned case 2, a PUSCH spatial relation based on CORESETs as described in the following options 1 to 4.

[[Option 1]]

The UE may be in accordance with existing methods described in cases 1 and 2. In other words, in this case, the UE may not predict that the simultaneous transmission with the UL beams/panels is scheduled. Alternatively, the UE may predict that PUSCH transmission by one UL beam/panel is scheduled.

[[Option 2]]

The UE predicts that one or more CORESETs are configured together with two TCI states. The PUSCH spatial relation for the new transmission scheme may be determined in accordance with two TCI states for a CORESET having the lowest ID out of the one or more CORESETs, a TCI state having the lowest ID from two CORESETs having the lowest ID out of the one or more CORESETs, or two TCI states having the lowest ID. In other words, DL multi-beam/panel reception from a plurality of TRPs may also be configured for a multi-panel UE for which UL multi-beam/panel simultaneous transmission is configured.

[[Option 3]]

When one or more CORESETs are configured together with two TCI states, the PUSCH spatial relation may be determined in accordance with two TCI states for a CORESET having the lowest ID out of the one or more CORESETs, a TCI state having the lowest ID from two CORESETs having the lowest ID out of the one or more CORESETs, or two TCI states having the lowest ID.

When one or more CORESETs are configured together with one TCI state, the PUSCH spatial relation may be determined in accordance with two TCI states from two CORESETs having the lowest ID out of the one or more CORESETs or two TCI states having the lowest ID from two CORESETs.

In option 2/3, when the CORESETs are configured together with more than two TCI states, the PUSCH spatial relation may be determined in accordance with two TCI states for a CORESET having the lowest ID, a TCI state having the lowest ID from two CORESETs having the lowest ID, or two TCI states having the lowest ID. For example, when repetitive transmissions are applied between MTRP, a CORESET having more than two TCI states may exist.

[[Option 4]]

When the CORESETs are configured together with one TCI state, the PUSCH spatial relation may be determined in accordance with two TCI states for a CORESET having the lowest ID and a CORESET having the second lowest ID. Option 4 may be applied in a plurality of CORESETs having different TCI state/spatial relation configurations. The PUSCH spatial relation of option 4 may be similar to that of option 2/3.

[Aspect 3-3]

In a case where a new RRC parameter for indication of the above-mentioned scheme 1/2/3 related to the PUSCH is configured, it is assumed that simultaneous transmission with UL beams/panels using scheme 1/2/3 is scheduled for the UE, and when the UL is scheduled by a plurality of (e.g., two) pieces of DCI from different CORESET pool indices (possible in scheme 2/3), the UE assumes, in the above-mentioned case 1, a PUSCH spatial relation based on PUCCH resources as described in the following options 1 to 4.

[[Option 1]]

The UE may be in accordance with existing methods described in cases 1 and 2. In other words, in this case, the UE may not assume that the simultaneous transmission with the UL beams/panels is scheduled. Alternatively, the UE may predict that PUSCH transmission by one UL beam/panel is scheduled.

[[Option 2]]

A spatial relation for each PUSCH scheduled by a plurality of pieces of DCI for the new transmission scheme may be determined in accordance with a TCI state/spatial relation for a PUCCH resource having the lowest ID out of one or more PUCCH resources related to the same CORESET pool index or a TCI state/spatial relation having the lowest ID for a PUCCH resource in the same CORESET pool index.

[[Option 3]]

When PUCCH resources are configured together with more than one TCI states/spatial relations, the spatial relation for each PUSCH scheduled by a plurality of pieces of DCI for the new transmission scheme may be determined in accordance with a TCI state/spatial relation having the lowest ID for a PUCCH resource having the lowest ID out of one or more PUCCH resources related to the same CORESET pool index or a TCI state/spatial relation having the lowest ID for a PUCCH in the same CORESET pool index.

Only in a case of repetitive transmissions between TRPs using single DCI-based scheduling, the PUCCH resources may be configured together with two beams (TCI states/spatial relations). Note, however, that when a single piece of DCI and multiple DCI are simultaneously configured, the PUCCH resources may be configured together with the two beams even in a case of repetitive transmissions between TRPs using multi-DCI-based scheduling.

[[Option 4]]

When PUCCH resources are configured together with one TCI state/spatial relation, each PUSCH spatial relation for the new transmission scheme may be determined in accordance with a TCI state/spatial relation having the lowest ID for a PUCCH resource having the lowest ID out of one or more PUCCH resources related to each CORESET pool index.

[Aspect 3-4]

In a case where a new RRC parameter for indication of the above-mentioned scheme 1/2/3 related to the PUSCH is configured, it is assumed that simultaneous transmission with UL beams/panels using scheme 1/2/3 is scheduled for the UE, and when the UL (PUSCH) is scheduled by a plurality of (e.g., two) pieces of DCI from different CORESET pool indices (possible in scheme 2/3), the UE assumes, in the above-mentioned case 2, a PUSCH spatial relation based on CORESETs as described in the following options 1 to 4.

[[Option 1]]

The UE may be in accordance with existing methods described in cases 1 and 2. In other words, in this case, the UE may not assume that the simultaneous transmission with the UL beams/panels is scheduled. Alternatively, the UE may predict that PUSCH transmission by one UL beam/panel is scheduled.

[[Option 2]]

A spatial relation for each PUSCH scheduled by a plurality of pieces of DCI for the new transmission scheme may be determined in accordance with a TCI state for a CORESET having the lowest ID out of one or more CORESETs related to the same CORESET pool index or a TCI state having the lowest ID for a CORESET in the same CORESET pool index.

[[Option 3]]

When PUCCH resources are configured together with more than one TCI states/spatial relations, the spatial relation for each PUSCH scheduled by a plurality of pieces of DCI for the new transmission scheme may be determined in accordance with a TCI state having the lowest ID for a CORESET having the lowest ID out of one or more CORESETs related to the same CORESET pool index or a TCI state having the lowest ID for a CORESET in the same CORESET pool index.

Only in a case of repetitive transmissions between TRPs using single DCI-based scheduling, the CORESETs may be configured together with two beams (TCI states). Note, however, that when a single piece of DCI and multiple DCI are simultaneously configured, the CORESETs may be configured together with the two beams even in a case of repetitive transmissions between TRPs using multi-DCI-based scheduling.

[[Option 4]]

When PUCCH resources are configured together with one TCI state, each PUSCH spatial relation for the new transmission scheme may be determined in accordance with a TCI state having the lowest ID for a CORESET having the lowest ID out of one or more CORESETs related to each CORESET pool index.

According to the present embodiment, the UE can appropriately assume (determine) a PUSCH spatial relation in the new transmission scheme.

Fourth Embodiment

In case 3 in 3GPP Rel. 16 below, a spatial relation is not indicated for a PUCCH. Thus, how to determine a PUCCH spatial relation when the above-mentioned scheme 1 is applied in the PUCCH or in repetitive transmissions of one PUCCH at the same time to which SDM described in variations of the first embodiment is applied has not been fully studied. Thus, the inventors of the present invention came up with the idea of a method for appropriately assuming (determining) the PUCCH spatial relation.

In the present embodiment, a UE determines a spatial relation for a physical uplink control channel (PUCCH) on the basis of a control resource set (CORESET) having the lowest identifier (ID), and simultaneously transmits the PUCCH on the basis of the spatial relation by using a plurality of coherent panels (scheme 1).

In the present disclosure, repetitive PUCCH transmissions to which SDM is applied may be interpreted as repetitive PUCCH transmissions to which TDM/FDM is applied.

[Case 3]

When the following conditions (1) to (4) are satisfied, a spatial configuration of PUCCH transmission from the UE may be the same as a spatial configuration of PDCCH reception by the UE in a CORESET having the lowest ID in an active DL BWP for a Primary Cell (PCell).

(1) pathlossReferenceRSs in PUCCH-PowerControl are provided for the UE.

(2) enableDefaultBeamPlForPUCCH is provided for the UE.

(3) PUCCH-SpatialRelationInfo is provided for the UE.

(4) A value of one CORESET pool index of some CORE-SETs in ControlResourceSet is provided for the UE or a value of one CORESET pool index of all CORESETs is provided for the UE and there is no codepoint for a TCI field in a DCI format (if any) for a search space set to map two TCI states.

In other words, in case 3, the PUCCH spatial relation (spatial configuration) is in accordance with QCL of the CORESET having the lowest ID.

[Aspect 4-1]

In the above-mentioned case 3, when a new RRC parameter for indication of the above-mentioned scheme 1 for the PUCCH is configured, the UE is assumed to transmit PUCCH repetitions to which SDM is applied by using a plurality of (two) beams/panels, and CORESET pool indices are not configured, the UE may assume a PUCCH spatial relation based on CORESETs as described in the following options 1 to 5.

For example, when CORESET pool indices are not configured and repetitive transmissions of a PUCCH is performed to which SDM is applied by using a plurality of panels, the UE may determine the PUCCH spatial relation on the basis of two TCI states for a CORESET having the lowest ID out of one or more CORESETs.

[[Option 1]]

The UE may be in accordance with an existing method described in case 3. In other words, in this case, the UE may not predict that simultaneous PUCCH transmission by UL beams/panels is scheduled. Alternatively, the UE may predict simultaneous PUSCH transmission by one UL beam/panel.

[[Option 2]]

The PUCCH spatial relation may be determined in accordance with two TCI states for two CORESETs having the lowest ID out of the one or more CORESETs or two TCI states having the lowest ID for two CORESETs.

[[Option 3]]

When two TCI states are configured for the CORESETs, the PUCCH spatial relation may be determined in accordance with the two TCI states for a CORESET having the lowest ID out of the one or more CORESETs.

[[Option 4]]

When more than two TCI states are configured for the CORESETs, the PUCCH spatial relation may be determined in accordance with two TCI states having the lowest ID for a CORESET having the lowest ID out of the one or more CORESETs or two TCI states having the lowest ID for a CORESET.

[[Option 5]]

When one TCI state is configured for the CORESETs, the PUCCH spatial relation may be determined in accordance with a TCI state with the lowest CORESET ID and a TCI state with the second lowest CORESET ID.

[Aspect 4-2]

In the above-mentioned case 3, when a new RRC parameter for indication of the above-mentioned scheme 1 for the PUCCH is configured, the UE predicts repetitive PUCCH transmissions to which SDM is applied by using a plurality of (two) beams/panels, and CORESET pool indices are configured, the UE may assume a PUCCH spatial relation based on CORESETs as described in the following options 1 to 4.

For example, when CORESET pool indices are configured and repetitive transmissions of a PUCCH is performed to which SDM is applied by using a plurality of panels, the UE may determine the PUCCH spatial relation on the basis of a TCI state for a CORESET having the lowest ID out of one or more CORESETs related to the same CORESET pool index.

[[Option 1]]

The UE may be in accordance with an existing method described in case 3. In other words, in this case, the UE may not predict that simultaneous PUCCH transmission by UL beams/panels is scheduled. Alternatively, the UE may predict simultaneous PUSCH transmission by one UL beam/panel.

[[Option 2]]

Each PUCCH spatial relation may be determined in accordance with a TCI state for a CORESET having the lowest ID out of the one or more CORESETs related to the same CORESET pool index or a TCI state having the lowest ID for a CORESET having the same CORESET pool index.

[[Option 3]]

When one TCI state is configured for the CORESET, each PUCCH spatial relation may be determined in accordance with a TCI state having the lowest ID for a CORESET having the lowest ID out of the one or more CORESETs related to the same CORESET pool index or a TCI state having the lowest ID for a CORESET having the same CORESET pool index.

[[Option 4]]

When one TCI state is configured for the CORESET, each PUCCH spatial relation for the new transmission scheme may be determined in accordance with a TCI state having the lowest ID for a CORESET having the lowest ID out of one or more CORESETs related to each CORESET pool index.

Only in a case of repetitive transmissions between TRPs using single DCI-based scheduling, the CORESETs may be configured together with two beams (TCI states). Note, however, that when a single piece of DCI and multiple DCI are simultaneously configured, the CORESETs may be configured together with the two beams even in a case of repetitive transmissions between TRPs using multi-DCI-based scheduling.

According to the present embodiment, the UE can appropriately determine a PUCCH spatial relation.

<UE Capability>

The UE may transmit (report) at least one of UE capabilities (UE capability information) described in the following (1) to (8). Note that method 1/2/3 indicates the above-mentioned transmission scheme.

(1) Whether to support scheme 1/2/3 for UL (PUSCH) transmission.

(2) Whether to support scheme 1 for UL (PUCCH) transmission.

(3) Whether to support the same or different time/frequency resource indication in scheme 1/2/3 for PUSCH transmission.

(4) Whether to support a single piece of DCI-based or multi-DCI-based PUSCH scheduling in scheme 1/2/3.

(5) Whether to support one/two/three DMRS CDM groups in PUSCH scheduling using scheme 1/2/3.

(6) Whether to support a table (e.g., FIG. 7 to FIG. 10) indicating enhanced DMRS ports.

(7) Whether to support two default beams for a PUSCH (application of single DCI/multi-DCI-based scheduling) using scheme 1/2/3.

(8) Whether to support two default beams for a PUSCH using scheme 1/2/3 (having or not having two CORE-SET pool indices).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 11:
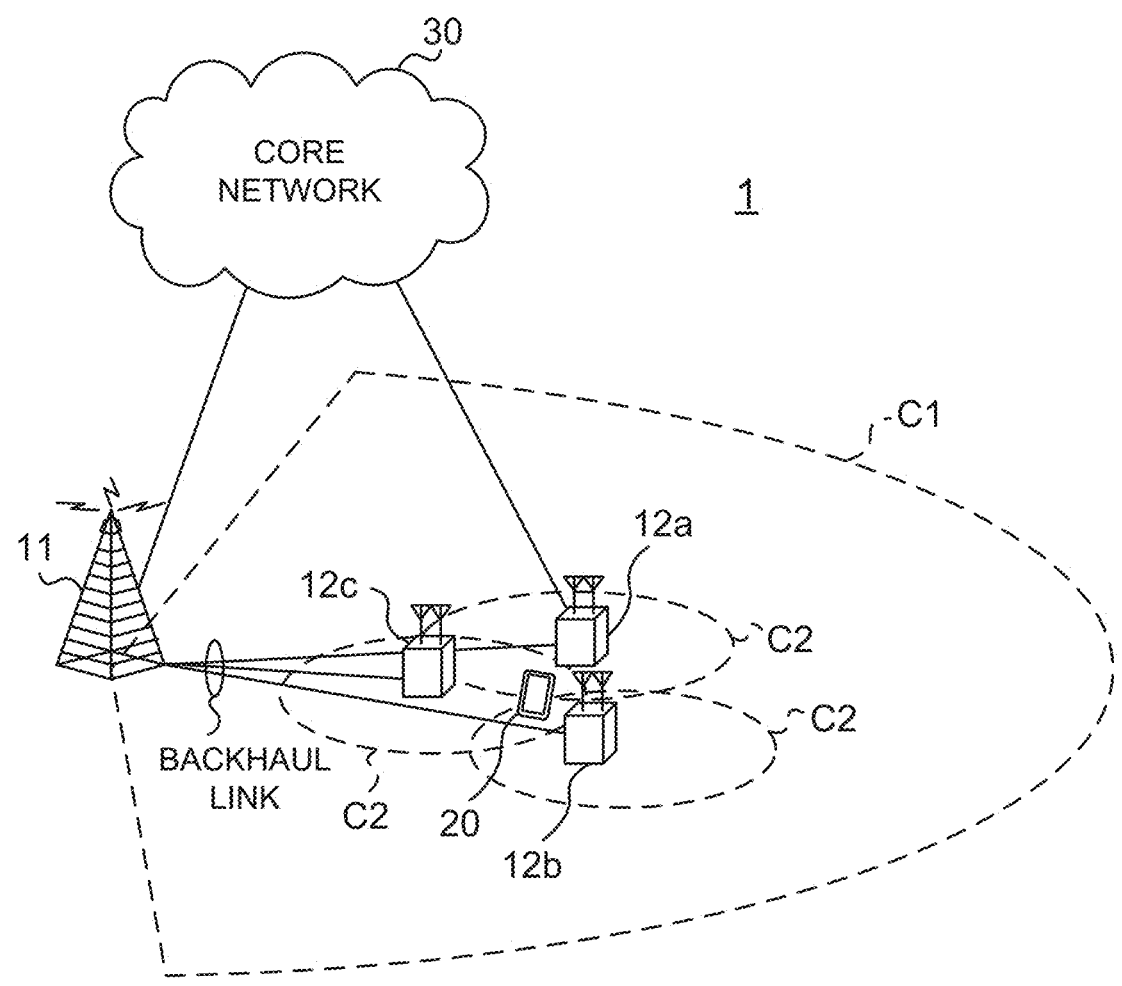
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant,"

"UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 12:
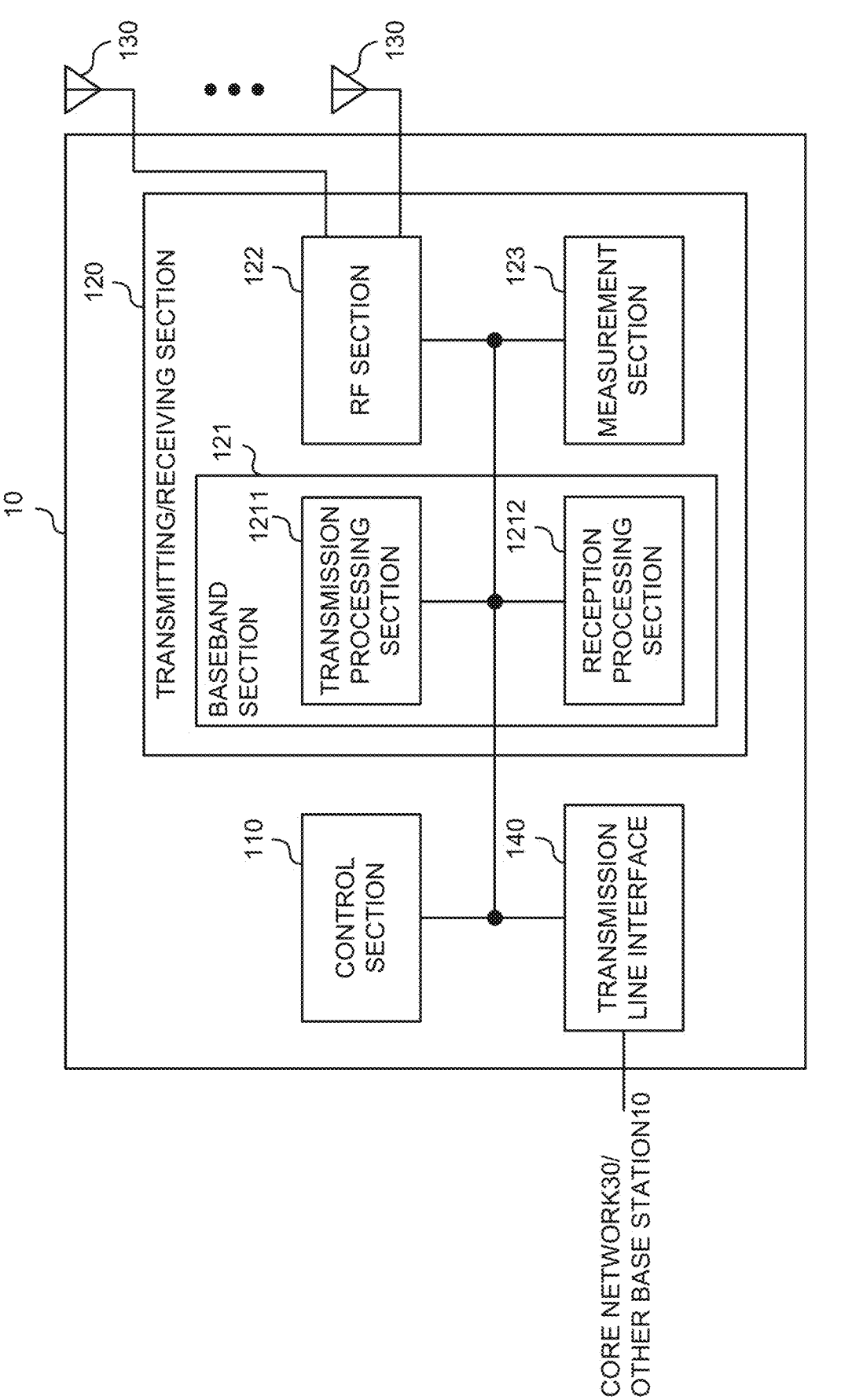
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-toanalog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a configuration related to transmission of a physical uplink shared channel by using higher layer signaling. The transmitting/receiving section 120 may receive, on the basis of the configuration, the physical uplink shared channel simultaneously transmitted with use of a plurality of coherent or non-coherent panels.

The control section 110 may configure a spatial relation for a physical uplink shared channel on the basis of a physical uplink control channel resource having a lowest identifier or a control resource set having a lowest identifier. The transmitting/receiving section 120 may receive, on the basis of the configuration, the physical uplink shared channel simultaneously transmitted with use of a plurality of coherent or non-coherent panels.

The control section 110 may determine a spatial relation for a physical uplink control channel on the basis of a control resource set having a lowest identifier. The transmitting/receiving section 120 may receive, on the basis of the spatial relation, the physical uplink control channel simultaneously transmitted with use of a plurality of coherent panels.

(User Terminal)

Figure 13:
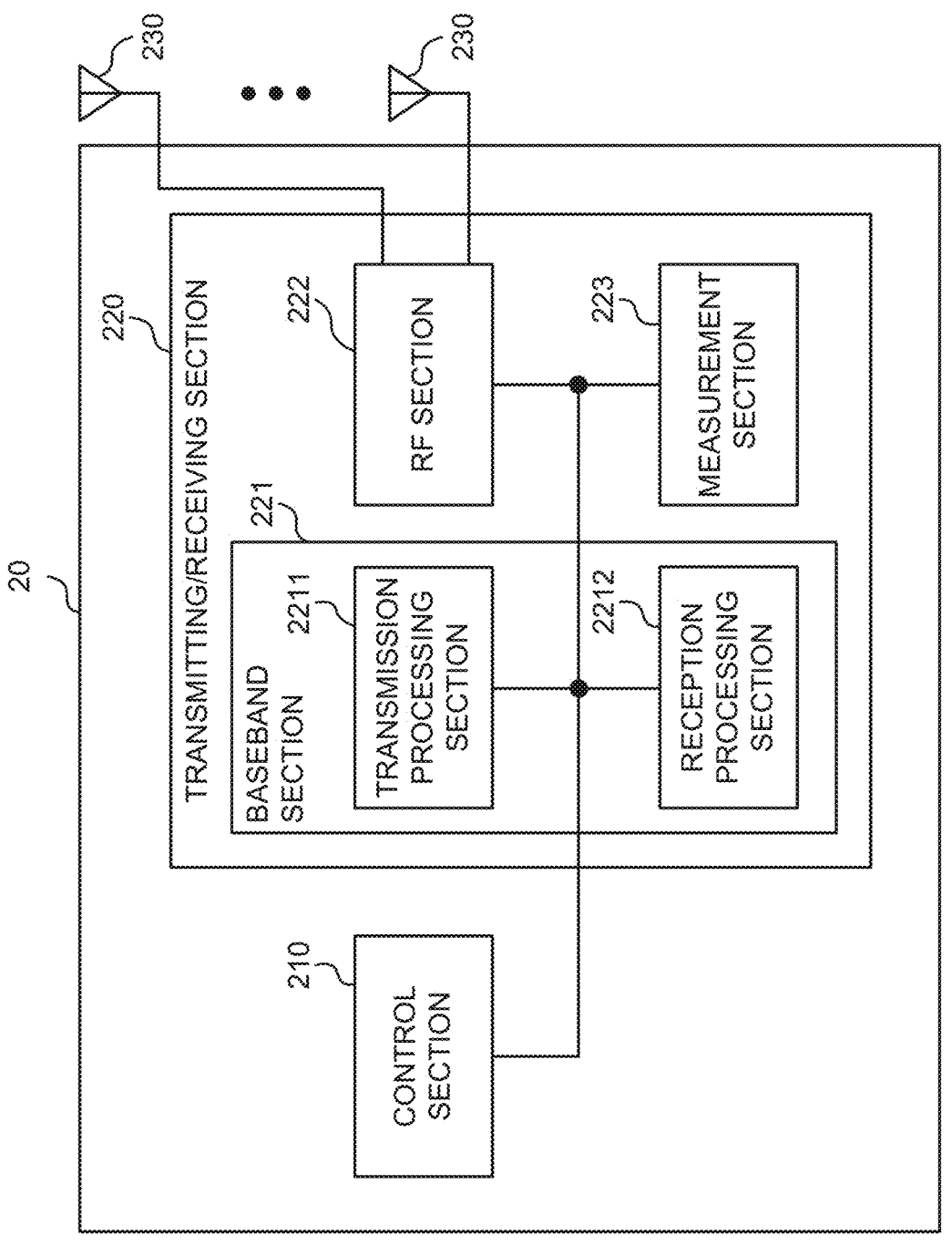
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a configuration related to transmission of a physical uplink shared channel by using higher layer signaling. The transmitting/receiving section 220 may simultaneously transmit, on the basis of the configuration, the physical uplink shared channel by using a plurality of coherent or non-coherent panels.

When using a plurality of coherent panels, the transmitting/receiving section 220 may transmit, in a same time resource and a same frequency resource, repetitive transmissions of the physical uplink shared channel to which space division multiplexing is applied.

When using a plurality of coherent panels, the transmitting/receiving section 220 may transmit, in a same time resource and different frequency resources, repetitive transmissions of the physical uplink shared channel to which frequency division multiplexing is applied.

When using a plurality of non-coherent panels, the transmitting/receiving section 220 may receive downlink control information including at least one of a sounding reference signal resource indicator, a transmitted precoding matrix indicator, and a transmission power control command that correspond to a code division multiplexing group. The transmitting/receiving section 220 may transmit the physical uplink shared channel on the basis of the downlink control information.

The control section 210 may determine a spatial relation for a physical uplink shared channel on the basis of a physical uplink control channel resource having a lowest identifier or a control resource set having a lowest identifier. The transmitting/receiving section 220 may simultaneously transmit the physical uplink shared channel by using a plurality of panels.

The transmitting/receiving section 220 may receive a single piece of downlink control information to schedule the physical uplink shared channel. When one or more physical uplink control channel resources are configured together with two transmission configuration indication (TCI) states, the spatial relation for the physical uplink shared channel may be in accordance with the two TCI states for a physical uplink control channel resource having a lowest identifier out of the one or more physical uplink control channel resources.

The transmitting/receiving section 220 may receive a single piece of downlink control information to schedule the physical uplink shared channel. When one or more control resource sets are configured together with two transmission configuration indication (TCI) states, the spatial relation for the physical uplink shared channel may be in accordance with the two TCI states for a control resource set having a lowest identifier out of the one or more control resource sets.

The transmitting/receiving section 220 may receive a plurality of pieces of downlink control information to schedule the physical uplink shared channel. A spatial relation for each physical uplink shared channel scheduled in the plurality of pieces of downlink control information may be in accordance with a transmission configuration indication (TCI) state for a physical uplink control channel resource having a lowest identifier out of one or more physical uplink control channel resources related to a same control resource set pool index or a transmission configuration indication (TCI) state for the control resource set having a lowest identifier out of one or more control resource sets related to a same control resource set pool index.

The control section 210 may determine a spatial relation for a physical uplink control channel on the basis of a control resource set having a lowest identifier. The transmitting/receiving section 220 may simultaneously transmit the physical uplink control channel on the basis of the spatial relation by using a plurality of coherent panels.

When a control resource set pool index is not configured and performing repetitive transmissions of the physical uplink control channel to which space division multiplexing is applied by using the plurality of the panels, the control section 210 may determine the spatial relation on the basis of two transmission configuration indication (TCI) states for the control resource set having the lowest identifier.

When a control resource set pool index is configured and performing repetitive transmissions of the physical uplink control channel to which space division multiplexing is applied by using the plurality of the panels, the control section 210 may determine the spatial relation on the basis of a transmission configuration indication (TCI) state for the control resource set having the lowest identifier out of one or more control resource sets related to a same control resource set pool index.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
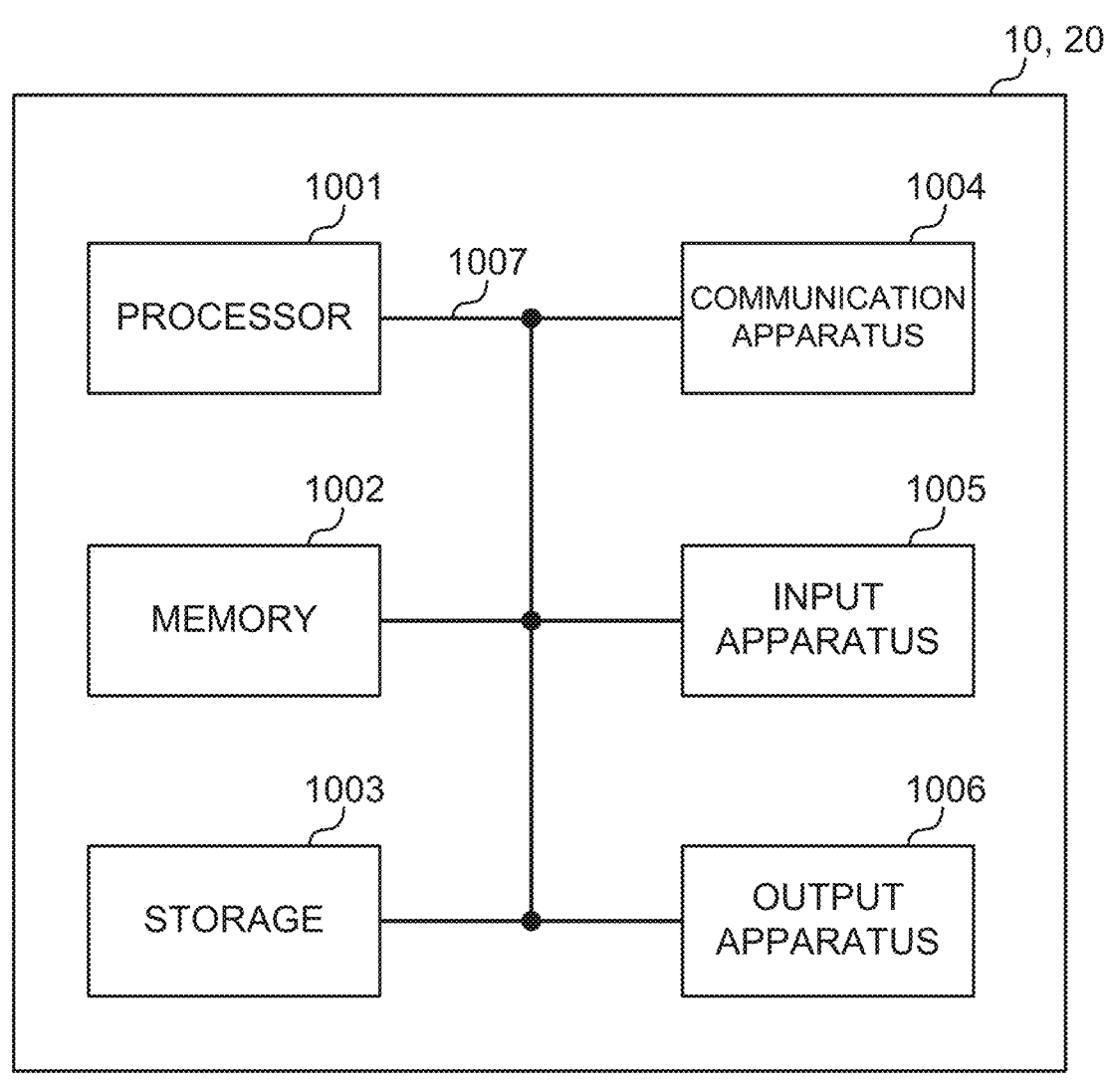
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink," "downlink," and the like may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer or decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are differ-ent" may mean that "A and B are different from each other." Note that the phrase may mean that "A and B is each different from C." The terms "separate," "be coupled," and so on may be interpreted similarly to "different."

When terms such as "include," "including," and varia-tions of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be imple-mented with various corrections and in various modifica-tions, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives, by radio resource control (RRC) signaling, a configuration of two transmission configu-ration indicator (TCI) states; and
a processor that controls, based on the two TCI states, repetitive transmission of a physical uplink control channel (PUCCH) using multiple panels,
wherein when a plurality of control resource set (CORE-SET) pool indices are configured, a spatial relation of the PUCCH is determined in accordance with the two TCI states corresponding to a CORESET that is asso-ciated with each of the configured CORESET pool indices, and
wherein the spatial relation of the PUCCH is same as a spatial relation of a physical downlink control channel (PDCCH) in the CORESET that is associated with each of the configured CORESET pool indices.

2. The terminal according to claim 1, wherein the pro-cessor controls transmission of the PUCCH in a same time resource and a same frequency resource.

3. A radio communication method for a terminal, com-prising:
receiving, by radio resource control (RRC) signaling, a configuration of two transmission configuration indi-cator (TCI) states; and

controlling based on the two TCI states, repetitive trans-mission of a physical uplink control channel (PUCCH) using multiple panels,
wherein when a plurality of control resource set (CORE-SET) pool indices are configured, a spatial relation of the PUCCH is determined in accordance with the two TCI states corresponding to a CORESET that is asso-ciated with each of the configured CORESET pool indices, and
wherein the spatial relation of the PUCCH is same as a spatial relation of a physical downlink control channel (PDCCH) in the CORESET that is associated with each of the configured CORESET pool indices.

4. A base station comprising:
a transmitter that transmits, by radio resource control (RRC) signaling, a configuration of two transmission configuration indicator (TCI) states; and
a processor that controls, based on the two TCI states, reception of a physical uplink control channel (PUCCH) that is transmitted with repetition using multiple panels,
wherein when a plurality of control resource set (CORE-SET) pool indices are configured, a spatial relation of the PUCCH is determined in accordance with the two TCI states corresponding to a CORESET that is asso-ciated with each of the configured CORESET pool indices, and
wherein the spatial relation of the PUCCH is same as a spatial relation of a physical downlink control channel (PDCCH) in the CORESET that is associated with each of the configured CORESET pool indices.

5. A system comprising a terminal and a base station, wherein
the base station comprises:
a transmitter that transmits, by radio resource control (RRC) signaling, a configuration of two transmission configuration indicator (TCI) states, and
the terminal comprises:
a receiver that receives the configuration of the two TCI states; and
a processor that controls, based on the two TCI states, repetitive transmission of a physical uplink control channel (PUCCH) using multiple panels,
wherein when a plurality of control resource set (CORESET) pool indices are configured, a spatial relation of the PUCCH is determined in accordance with the two TCI states corresponding to a CORE-SET that is associated with each of the configured CORESET pool indices, and
wherein the spatial relation of the PUCCH is same as a spatial relation of a physical downlink control channel (PDCCH) in the CORESET that is associ-ated with each of the configured CORESET pool indices.

* * * * *